US012277890B2

(12) United States Patent
Lin et al.

(10) Patent No.: US 12,277,890 B2
(45) Date of Patent: Apr. 15, 2025

(54) SYSTEM AND METHOD FOR CALIBRATING A DISPLAY PANEL

(71) Applicant: Kunshan Yunyinggu Electronic Technology Co., Ltd., Kunshan (CN)

(72) Inventors: Yaoming Lin, Kunshan (CN); Haining Xu, Kunshan (CN)

(73) Assignee: Kunshan Yunyinggu Electronic Technology Co., Ltd., Kunshan (CN)

( * ) Notice: Subject to any disclaimer, the term of this patent is extended or adjusted under 35 U.S.C. 154(b) by 11 days.

(21) Appl. No.: 18/206,138

(22) Filed: Jun. 6, 2023

(65) Prior Publication Data

US 2024/0371309 A1 Nov. 7, 2024

Related U.S. Application Data

(63) Continuation of application No. PCT/CN2023/091928, filed on May 1, 2023.

(51) Int. Cl.
*G09G 3/20* (2006.01)
*G09G 3/3225* (2016.01)
*G09G 3/36* (2006.01)

(52) U.S. Cl.
CPC ......... *G09G 3/2092* (2013.01); *G09G 3/2007* (2013.01); *G09G 3/3225* (2013.01); *G09G 3/3607* (2013.01); *G09G 2320/0666* (2013.01); *G09G 2320/0693* (2013.01)

(58) Field of Classification Search
CPC .. G09G 3/2092; G09G 3/2007; G09G 3/3225; G09G 3/3607; G09G 2320/0666; G09G 2320/0693
See application file for complete search history.

(56) References Cited

U.S. PATENT DOCUMENTS

| | | | | |
|---|---|---|---|---|
| 6,031,569 A * | 2/2000 | Nobuoka | H04N 23/84 348/E9.01 |
| 6,658,146 B1 * | 12/2003 | Iourcha | G06T 9/005 382/162 |
| 7,046,387 B1 * | 5/2006 | Yagishita | H04N 11/042 375/E7.137 |
| 9,900,503 B1 * | 2/2018 | Bedi | H04N 9/646 |
| 10,964,240 B1 * | 3/2021 | Woodall | G09G 3/2003 |
| 2002/0061130 A1 * | 5/2002 | Kirk | G06T 7/55 382/154 |
| 2006/0061538 A1 * | 3/2006 | Dispoto | G09G 3/3426 345/102 |
| 2006/0274386 A1 * | 12/2006 | Wakazono | H04N 23/88 358/448 |
| 2007/0177205 A1 * | 8/2007 | Yamada | H04N 1/0044 358/1.15 |
| 2008/0044088 A1 * | 2/2008 | Nakai | G06T 3/4015 386/E5.067 |

(Continued)

*Primary Examiner* — Jose R Soto Lopez
(74) *Attorney, Agent, or Firm* — Bayes PLLC

(57) ABSTRACT

The present disclosure provides a system and method for calibrating a display panel. The system includes a display panel including a pixel array and a controller. The processor is configured to, upon executing instructions: define a calibration vector with a source pixel, a vector volume, and a calibration range; calculate a distance between a pixel to be calibrated and the source pixel; calculate a calibration amount based on the distance and the vector volume; and calibrate the pixel to be calibrated based on the calibration amount and the calibration vector.

19 Claims, 12 Drawing Sheets

(56) References Cited

U.S. PATENT DOCUMENTS

2009/0003692 A1* 1/2009 Pettersson ............... G06T 9/008 382/166
2009/0034837 A1* 2/2009 Kato ......................... G06T 5/40 382/167
2009/0066804 A1* 3/2009 Kurokawa ............. H04N 5/772 348/222.1
2009/0123066 A1* 5/2009 Moriya ................ H04N 19/174 382/166
2009/0167782 A1* 7/2009 Petljanski ............. G06F 3/1446 345/601
2010/0208312 A1* 8/2010 Hashizume .......... H04N 1/6055 356/402
2010/0322491 A1* 12/2010 Long ......................... G06T 5/94 382/128
2011/0050695 A1* 3/2011 Sullivan ................... G09G 5/02 345/426
2011/0193873 A1* 8/2011 Son ......................... G06T 11/00 345/589
2011/0200254 A1* 8/2011 Taniguchi ................. G06T 1/60 382/173
2011/0243467 A1* 10/2011 Igarashi ................... H04N 1/41 382/234
2011/0286665 A1* 11/2011 Umeda ................ H04N 1/6086 382/167
2013/0243291 A1* 9/2013 Varsha ................... A61B 6/503 382/131
2015/0103108 A1* 4/2015 Seong .................. G09G 3/3208 345/694
2015/0172616 A1* 6/2015 Ye .......................... H04N 19/80 348/43
2015/0229934 A1* 8/2015 Li .......................... H04N 19/44 375/240.16
2015/0304664 A1* 10/2015 Li ........................ H04N 19/105 375/240.02
2016/0080712 A1* 3/2016 Daly ...................... H04N 1/646 345/597
2016/0086572 A1* 3/2016 Nasiriavanaki .......... G09G 5/06 345/590
2016/0267631 A1* 9/2016 Shen ......................... G06T 5/40
2016/0329027 A1* 11/2016 Huang ................. H04N 13/324
2017/0249744 A1* 8/2017 Wang ........................ G06T 1/60
2018/0040307 A1* 2/2018 Mclin .................... G09G 5/393
2018/0068208 A1* 3/2018 Arazaki ............. G06K 15/1836
2019/0278323 A1* 9/2019 Aurongzeb ........... G06F 1/1652
2020/0068091 A1* 2/2020 Kakutani ................. H04N 1/52
2020/0074584 A1* 3/2020 Nagao ................... G06F 9/5038
2020/0098079 A1* 3/2020 Kim ....................... G09G 5/393
2020/0312256 A1* 10/2020 Lin ...................... G09G 3/3607
2020/0335026 A1* 10/2020 Lin ...................... G09G 3/3208
2020/0342220 A1* 10/2020 Iwata ................... G06V 10/811
2021/0012469 A1* 1/2021 Yoshitani .................. G06T 1/20
2022/0036495 A1* 2/2022 Reed ..................... G06T 1/0028
2022/0051640 A1* 2/2022 Zhong .................. G09G 3/2092
2022/0078397 A1* 3/2022 Shao ...................... G09G 5/003
2022/0173166 A1* 6/2022 Togashi ............ H01L 27/14607
2022/0223076 A1* 7/2022 Agahian ................ G09G 3/006
2022/0284846 A1* 9/2022 Miao ........................ G09G 5/02
2022/0358867 A1* 11/2022 Paudel ................. G09G 3/3208
2022/0375427 A1* 11/2022 Paudel ................. G09G 3/3208
2023/0206810 A1* 6/2023 Kim ..................... G09G 3/2003 345/691
2023/0255460 A1* 8/2023 Kojima ................ A61B 5/0086
2023/0262210 A1* 8/2023 Zhong .................. H04N 19/146 375/240.03
2023/0269430 A1* 8/2023 Seo .................. H04N 21/44213 725/24
2023/0326380 A1* 10/2023 He ........................... G09G 3/03 345/690
2024/0054743 A1* 2/2024 Li ........................... G06F 3/011

* cited by examiner

1100

SYSTEM AND METHOD FOR CALIBRATING A DISPLAY PANEL

CROSS REFERENCE TO RELATED APPLICATIONS

This application is a continuation of International Application No. PCT/CN2023/091928, filed on May 1, 2023, which is hereby incorporated by reference in its entirety.

BACKGROUND

The disclosure relates generally to display technologies, and more particularly, to system and method for calibrating a display panel.

In display technology, differences in manufacturing and calibration can result in differences in product performance. For example, these differences may exist in the backlight performance of liquid crystal display (LCD) panels, light-emitting performance of organic light-emitting diode (OLED) display panels, and performance of thin-film transistors (TFTs), resulting differences in the maximum brightness level, variation in brightness levels and/or or chrominance values. Meanwhile, different geographic locations, devices, and applications may require different display standards for display panels. For example, display standards on the display panels in Asia and Europe may require different color temperature ranges. To satisfy different display standards, display panels are often calibrated to meet desired display standards.

SUMMARY

In one example, a system for display is provided. The system includes a display panel including a pixel array and a controller. The processor is configured to, upon executing instructions: define a calibration vector with a source pixel, a vector volume, and a calibration range; calculate a distance between a pixel to be calibrated and the source pixel; calculate a calibration amount based on the distance and the vector volume; and calibrate the pixel to be calibrated based on the calibration amount and the calibration vector.

In some implementations, the source pixel is a three-dimensional parameter ($R_{scr}$, $G_{scr}$, $B_{scr}$) configured to determine a central point for calibration, where $R_{scr}$ is a grayscale value of a red channel of the source pixel; $G_{scr}$ is a grayscale value of a green channel of the source pixel; and $B_{scr}$ is a grayscale value of a blue channel of the source pixel.

In some implementations, the vector volume is a three-dimensional parameter ($V_R$, $V_G$, $V_B$) configured to determine a maximal volume for calibration, where $V_R$ is a calibration value of a red channel of the source pixel; $V_G$ is a calibration value of a green channel of the source pixel; and $V_B$ is a calibration value of a bule channel of the source pixel.

In some implementations, the calibration range is a four-dimensional parameter ($V_{Range}$, $S_R$, $S_G$, $S_B$) configured to determine a calibration scope, pixels within the calibration scope are calibrated by the calibration vector, where $V_{Range}$ is a preset distance between the pixel to be calibrated and the source pixel, the pixel to be calibrated is calibrated by the calibration vector when the distance between the pixel to be calibrated and the source pixel is smaller than $V_{Range}$, $S_R$ is a calculation factor of a red channel when calculating the distance between the pixel to be calibrated and the source pixel; $S_G$ is a calculation factor of a green channel when calculating the distance between the pixel to be calibrated and the source pixel; and $S_B$ is a calculation factor of a blue channel when calculating the distance between the pixel to be calibrated and the source pixel.

In some implementations, the distance between a pixel to be calibrated, and the source pixel is negatively correlated with the calibration amount applied on the pixel to be calibrated.

In some implementations, the processor is further configured to calculate a calibration weight based on the distance between a pixel to be calibrated and the source pixel and calculate the calibration amount based on the calibration weight and the vector volume, the calibration amount is a three-dimensional parameter ($\Delta V_R$, $\Delta V_G$, $\Delta V_B$), where $\Delta V_R$ is a calibration amount of a red channel of the source pixel; $\Delta V_G$ is a calibration amount of a green channel of the source pixel; and $\Delta V_B$ is a calibration amount of a blue channel of the source pixel.

In some implementations, the processor is further configured to calibrate the pixel to be calibrated based on a plurality of the calibration vectors corresponding to the more than one the calibration vectors.

In some implementations, the plurality of calibration vectors are placed in a sequential order.

In some implementations, the plurality of calibration vectors are placed in a parallel order.

In some implementations, the calibration vector comprises at least one of a marginal vector for calibrating pixels of the pixel array, a white balance vector for compensating the pixels of the pixel array, or a local vector for calibrating at least one of the pixels of the pixel array.

In some implementations, the system further includes a register configured to store the calibration vector defined by the vector defining module. The calibration vector stored in the register is retrieved by the processor repeatedly.

In another example, a method for calibrating a display having a pixel array is provided. The method includes four operations: defining a calibration vector with a source pixel, a vector volume, and a calibration range; calculating a distance between a pixel to be calibrated and the source pixel; calculating a calibration amount based on the distance and the vector volume; and calibrating the pixel to be calibrated based on the calibration amount and the calibration vector.

In some implementations, the source pixel is a three-dimensional parameter ($R_{scr}$, $G_{scr}$, $B_{scr}$) configured to determine a central point for calibration, where $R_{scr}$ is a grayscale value of a red channel of the source pixel; $G_{scr}$ is a grayscale value of a green channel of the source pixel; and $B_{scr}$ is a grayscale value of a blue channel of the source pixel.

In some implementations, the vector volume is a three-dimensional parameter ($V_R$, $V_G$, $V_B$) configured to determine a maximal volume for calibration, where $V_R$ is a calibration value of a red channel of the source pixel; $V_G$ is a calibration value of a green channel of the source pixel; and $V_B$ is a calibration value of a blue channel of the source pixel.

In some implementations, the calibration range is a four-dimensional parameter ($V_{Range}$, $S_R$, $S_G$, $S_B$) configured to determine a calibration scope, pixels within the calibration scope are calibrated by the calibration vector, where $V_{Range}$ is a preset distance between the pixel to be calibrated and the source pixel, the pixel to be calibrated is calibrated by the calibration vector when the distance between the pixel to be calibrated and the source pixel is smaller than $V_{Range}$; $S_R$ is a calculation factor of a red channel when calculating the distance between the pixel to be calibrated and the source pixel; $S_G$ is a calculation factor of a green channel when calculating the distance between the pixel to be calibrated and the source pixel; and $S_B$ is a calculation factor of a blue channel when calculating the distance between the pixel to be calibrated and the source pixel.

In some implementations, the distance between a pixel to be calibrated and the source pixel is negatively correlated with the calibration amount applied on the pixel to be calibrated.

In some implementations, the calculating a calibration amount based on the distance and the vector volume includes calculating a calibration weight based on the distance between a pixel to be calibrated and the source pixel and calculating the calibration amount based on the calibration weight and the vector volume, the calibration amount is a three-dimensional parameter ($\Delta V_R$, $\Delta V_G$, $\Delta V_B$). Where $\Delta V_R$ is a calibration amount of a red channel of the source pixel; $\Delta V_G$ is a calibration amount of a green channel of the source pixel; and $\Delta V_B$ is a calibration amount of a blue channel of the source pixel.

In some implementations, the pixel to be calibrated is calibrated based on a plurality of the calibration vectors and a plurality of calibration amounts corresponding to the calibration vectors.

In some implementations, the calibration vector comprises at least one of a marginal vector for calibrating pixels of the pixel array, a white balance vector for compensating the pixels of the pixel array, or a local vector calibrating at least one of the pixels of the pixel array.

In yet another example, a processor for calibrating a display having a pixel array is provided. The processor includes a vector defining module configured to define a calibration vector with a source pixel, a vector volume, and a calibration range; a first calculator configured to calculate a distance between a pixel to be calibrated and the source pixel; a second calculator configured to calculate a calibration amount based on the distance and the vector volume; and a calibrating module configured to calibrate the pixel to be calibrated based on the calibration amount and the calibration vector.

DETAILED DESCRIPTION

Figure 1:
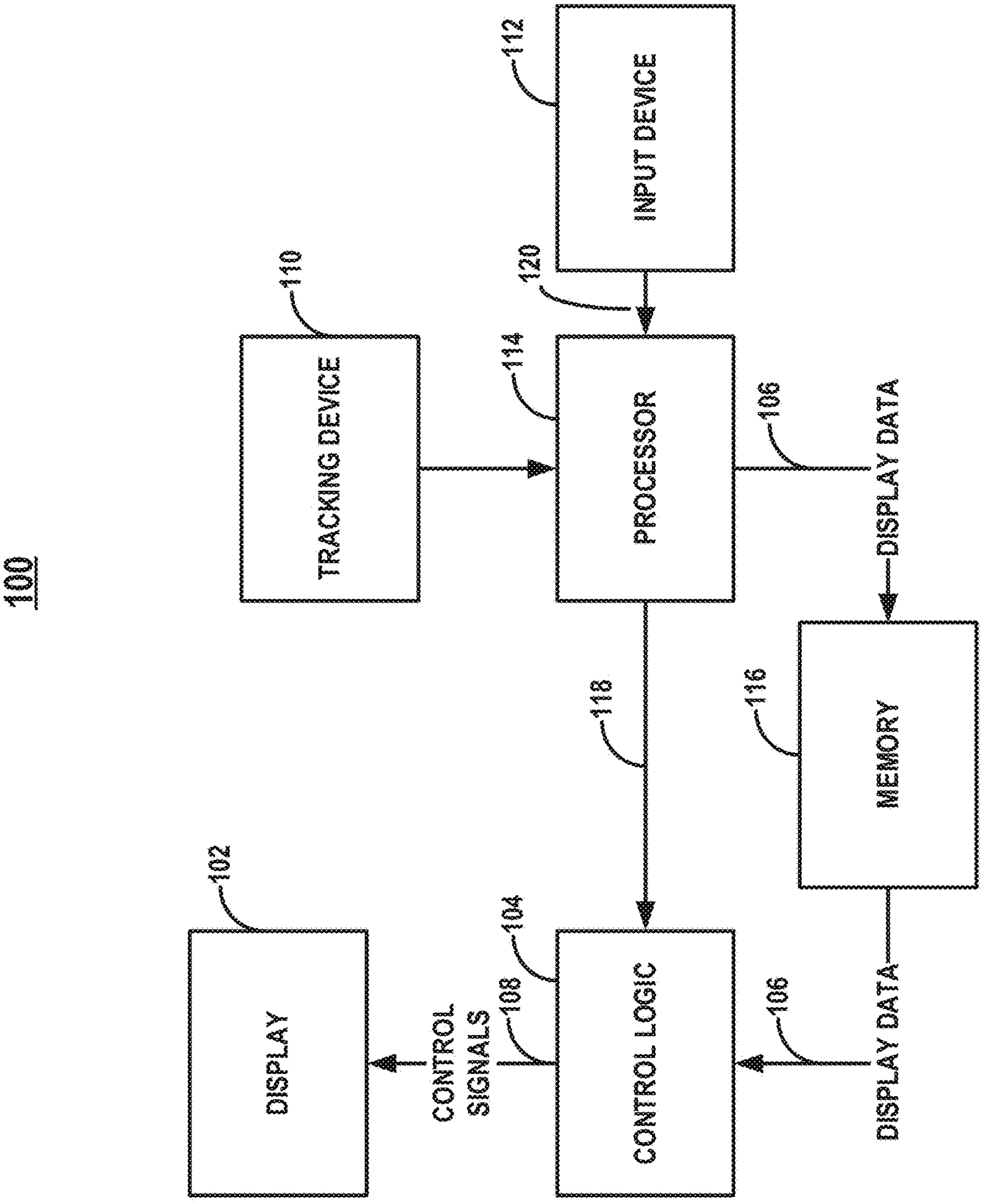
FIG. 1 is a block diagram illustrating an apparatus including a display and control logic in accordance with an embodiment.

In the following detailed description, numerous specific details are set forth by way of examples in order to provide a thorough understanding of the relevant disclosures. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In the present disclosure, each pixel or subpixel of a display panel can be directed to assume a luminance/pixel value discretized to the standard set [0, 1, 2, . . . , $(2^N-1)$], where N represents the bit number and is a positive integer. A triplet of such pixels/subpixels provides the red (R), green (G), and B (blue) components that make up an arbitrary color, which can be updated in each frame. Each of the pixel values corresponds to a different grayscale value. For ease of description, the grayscale value of a pixel is also discretized to a standard set [0, 1, 2, . . . , $(2^N-1)$]. In the present disclosure, a pixel value and a grayscale value each represents the voltage applied on the pixel/subpixel. In the present disclosure, a grayscale mapping correlation lookup table (LUT) is employed to describe the mapping correlation between a grayscale value of a pixel and a set of mapped pixel values of subpixels. In the present disclosure, the display data of a pixel can the represented in the forms of different attributes. For example, display data of a pixel can be represented as (R, G, B), where R, G, and B each represents a respective pixel value of a subpixel in the pixel. In another example, the display data of a subpixel can be represented as (Y, x, y), where Y represents the luminance value, and x and y each represents a chrominance value. For illustrative purposes, the present disclosure only describes a pixel having three subpixels, each displaying a different color (e.g., R, G, and B colors). It should be appreciated that the disclosed methods can be applied to pixels having any suitable number of subpixels that can separately display various colors, such as 2 subpixels, 4 subpixels, 5 pixels, and so forth. The number of subpixels and the colors displayed by the subpixels should not be limited by the embodiments of the present disclosure.

In the present disclosure, a numerical space is employed to illustrate the method for determining a set of mapped pixels mapped to a grayscale value based on a target luminance value and a plurality of target chrominance values. The numerical space has a plurality of axes extending from an origin. Each of the three axes represents the grayscale value of one color displayed by the display panel. For ease of description, the numerical space has three axes, each being orthogonal to one another and representing the pixel value of a subpixel in a pixel to display a color. In some embodiments, the numerical space is an RGB space having three axes, representing the pixel values for a subpixel to display a red (R) color, a green (G) color, and a blue (B) color. A point in the RGB space can have a set of coordinates. Each component (i.e., one of the coordinates) of the set of coordinates represents the pixel value (i.e., displayed by the respective subpixel) along the respective axis. For example, a point of (R0, G0, B0) represents a pixel having pixel values of R0, G0, and B0 applied respectively on the R, G, and B subpixels. The RGB space is employed herein to, e.g., determine different sets of pixel values for ease of description, and can be different from a standard RGB color space defined as a color space based on the RGB color model. For example, the RGB space employed herein represents the colors that can be displayed by the display panel. These colors may or may not be the same as the colors defined in a standard RGB color space.

Figure 5:
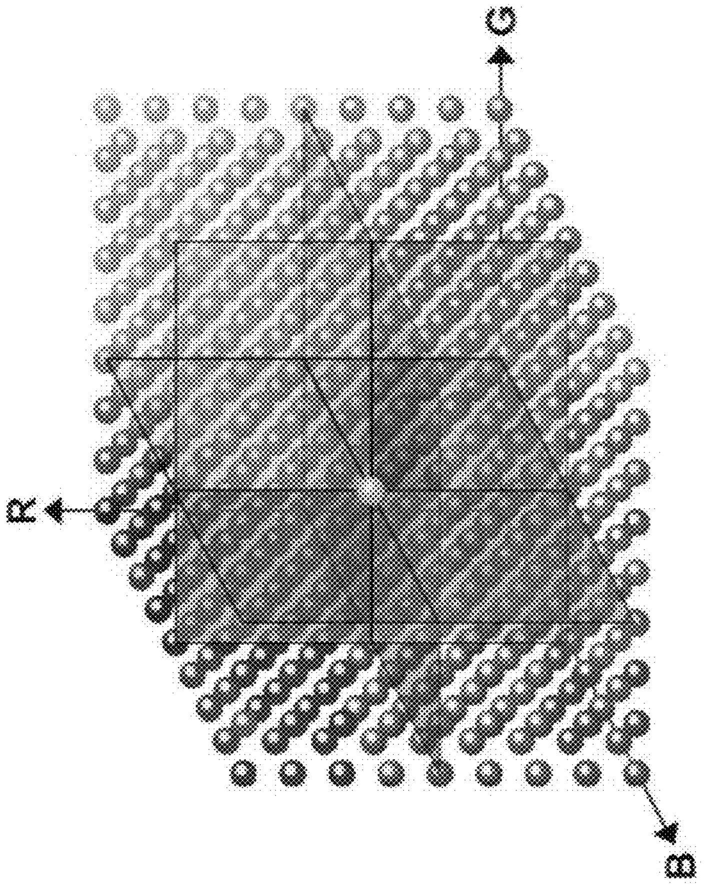
FIG. 5 is an illustration diagram of a transmission space of a mapping correlation lookup table.

In display technology, display panels are calibrated to have different input/output characteristics for various reasons. LUTs are widely used in common calibrations of display panels. LUTs are basically conversion matrices, of different complexities, with the two main options being one-dimension (1D) LUTs or three-dimension (3D) LUTs. A LUT takes an input value and outputs a new value based on the data within the LUT. ID LUTs can only re-map individual input values to new output values based on the LUT data—a simple one input to one output process, regardless of the actual RGB pixel value. 3D LUTs can re-map individual input values to any number of output values based on the LUT data, and the other associated input RGB pixel data. Referring to FIG. 5, a 3D LUT is a 3D lattice of output RGB color values that can be indexed by sets of input RGB color values. Each axis of the lattice represents one of the three input color components, and the input color thus defines a point inside the lattice. As 1D LUT and Matrix combinations are limited in color control capability, 3D LUTs are preferred for accurate color management as they provide full volumetric non-linear color adjustment.

The disadvantages of 3d LUT cannot be ignored at the same time. If a 3D LUT were to have values for each and every input-to-output combination, the LUT would be very large—so large as to be impossible to use. A 3D LUT using every input-to-output value for 10-bit image workflows would be a 1024-point LUT and would have 1,073,741,824 points ($1024^3$). So, most 3D LUTs use cubes in the range of $17^3$ to $64^3$. For a $17^3$ 3D LUT, it means there are 17 input points to output points for each axis, and accuracy is sacrificed to reduce the amount of data storage. Further, as values between these points must be interpolated, and different systems do this with different levels of accuracy, the exact same 3D LUT used in two different systems will, in all probability, produce a subtly different result.

To overcome the above-mentioned issues, a system and a method for calibrating a display panel are provided. One or more calibration vectors are used in place of 3D LUT for calibration. A calibration vector has three parameters: a source pixel, a vector volume, and a calibration range. The source pixel is a three-dimensional parameter configured to determine a central point for calibration. The vector volume is a three-dimensional parameter configured to determine a maximal volume for calibration. The calibration range is a four-dimensional parameter configured to determine a calibration scope, and pixels within the calibration scope are calibrated by the calibration vector. By employing one or more calibration vectors, precise and complex calibration can be performed to specific color within a specific scope with a small data storage. The method can be used to calibrate any suitable types of display panels, such as LCDs and OLED displays. In some embodiments, the calibration is computed by a processor (or an application processor (AP)), and/or a control logic (or a display driver integrated circuit (DDIC)).

Additional novel features will be set forth in part in the description which follows, and in part will become apparent to those skilled in the art upon examination of the following and the accompanying drawings or may be learned by the production or operation of the examples. The novel features of the present disclosure may be realized and attained by practice or use of various aspects of the methodologies, instrumentalities, and combinations set forth in the detailed examples discussed below.

FIG. 1 illustrates an apparatus 100 including a display panel 102 and control logic 104. Apparatus 100 may be any suitable device, for example, a VR/AR device (e.g., VR headset, etc.), handheld device (e.g., dumb or smart phone, tablet, etc.), wearable device (e.g., eyeglasses, wrist watch, etc.), automobile control station, gaming console, television set, laptop computer, desktop computer, netbook computer, media center, set-top box, global positioning system (GPS), electronic billboard, electronic sign, printer, or any other suitable device. In this embodiment, display panel 102 is operatively coupled to control logic 104 and is part of apparatus 100, such as but not limited to, a head-mounted display, computer monitor, television screen, head-up display (HUD), dashboard, electronic billboard, or electronic sign. Display panel 102 may be an OLED display, microLED display, liquid crystal display (LCD), E-ink display, electroluminescent display (ELD), billboard display with LED or incandescent lamps, or any other suitable type of display.

Control logic 104 may be any suitable hardware, software, firmware, or combination thereof, configured to receive display data 106 (e.g., pixel data) and generate control signals 108 for driving the subpixels on display panel 102. Control signals 108 are used for controlling writing of display data to the subpixels and directing operations of display panel 102. For example, subpixel rendering (SPR) algorithms for various subpixel arrangements may be part of control logic 104 or implemented by control logic 104. Control logic 104 may include any other suitable components, such as an encoder, a decoder, one or more processors, controllers, and storage devices. Control logic 104 may be implemented as a standalone integrated circuit (IC) chip, such as an application-specific integrated circuit (ASIC) or a field-programmable gate array (FPGA). In some embodiments, control logic 104 may be manufactured in a chip-on-glass (COG) package, for example, when display panel 102 is a rigid display. In some embodiments, control logic 104 may be manufactured in a chip-on-film (COF) package, for example, when display panel 102 is a flexible display, e.g., a flexible OLED display.

Apparatus 100 may also include any other suitable component such as, but not limited to tracking devices 110 (e.g., inertial sensors, camera, eye tracker, GPS, or any other suitable devices for tracking motion of eyeballs, facial expression, head movement, body movement, and hand gesture) and input devices 112 (e.g., a mouse, keyboard, remote controller, handwriting device, microphone, scanner, etc.). Input devices 112 may transmit input instructions 120 to processor 114 to be processed and executed. For example, input instructions 120 may include computer programs and/or manual input to command processor 114 to perform a test and/or calibration operation on control logic 104 and/or display panel 102.

In this embodiment, apparatus 100 may be a handheld or a VR/AR device, such as a smart phone, a tablet, or a VR headset. Apparatus 100 may also include a processor 114 and memory 116. Processor 114 may be, for example, a graphics processor (e.g., graphics processing unit (GPU)), an application processor (AP), a general processor (e.g., APU, accelerated processing unit; GPGPU, general-purpose computing on GPU), or any other suitable processor. Memory 116 may be, for example, a discrete frame buffer or a unified memory. Processor 114 is configured to generate display data 106 in consecutive display frames and may temporally store display data 106 in memory 116 before sending it to control logic 104. Processor 114 may also generate other data, such as but not limited to, control instructions 118 or test signals, and provide them to control logic 104 directly or through memory 116. Control logic 104 then receives display data 106 from memory 116 or directly from processor 114.

Figure 2A:
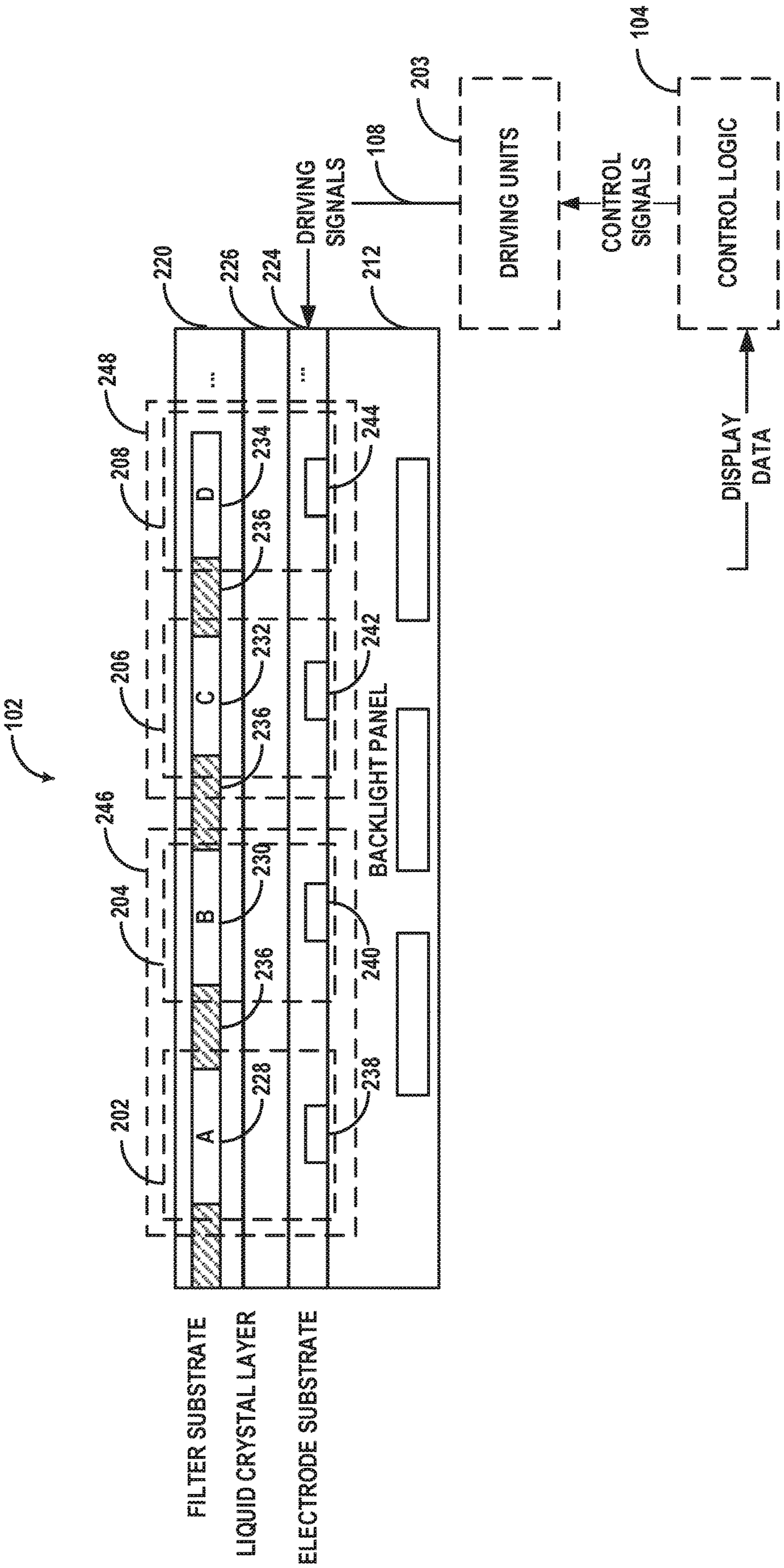
FIGS. 2A and 2B are each a side-view diagram illustrating an example of the display shown in FIG. 1 in accordance with various embodiments.

FIG. 2A illustrates one example of the display panel 102 including an array of subpixels 202, 204, 206, 208. Display panel 102 may be LCDs, such as a twisted nematic (TN) LCD, in-plane switching (IPS) LCD, advanced fringe field switching (AFFS) LCD, vertical alignment (VA) LCD, advanced super view (ASV) LCD, blue phase mode LCD, passive-matrix (PM) LCD, or any other suitable display. Display panel 102 may include a backlight panel 212 operatively coupled to control logic 104. Backlight panel 212 includes light sources for providing lights to display area, such as but not limited to, incandescent light bulbs, LEDs, EL panel, cold cathode fluorescent lamps (CCFLs), and hot cathode fluorescent lamps (HCFLs), to name a few. Display panel 102 may include a driving unit 203, display panel 102 is operatively coupled to the control logic 104 via driving units 203 to transfer the control signals into driving signals for the LCD units.

Display panel 102 may be, for example, a TN panel, an IPS panel, an AFFS panel, a VA panel, an ASV panel, or any other suitable display panel. In this example, the display panel 102 includes a filter substrate 220, an electrode substrate 224, and a liquid crystal layer 226 disposed between the filter substrate 220 and the electrode substrate 224. As shown in FIG. 2A, the filter substrate 220 includes a plurality of filters 228, 230, 232, 234 corresponding to the plurality of subpixels 202, 204, 206, 208, respectively. A, B, C, and D in FIG. 2A denote four different types of filters, such as but not limited to, red, green, blue, yellow, cyan, magenta, or white filter. Filter substrate 220 may also include a black matrix 236 disposed between the filters 228, 230, 232, 234, as shown in FIG. 2. The black matrix 236, as the borders of the subpixels 202, 204, 206, 208, is used for blocking the lights coming out from the parts outside the filters 228, 230, 232, 234. In this example, the electrode substrate 224 includes a plurality of electrodes 238, 240, 242, 244 with switching elements, such as thin film transistors (TFTs), corresponding to the plurality of filters 228, 230, 232, 234 of the plurality of subpixels 202, 204, 206, 208, respectively. The electrodes 238, 240, 242, 244 with the switching elements may be individually addressed by the control signals 108 from the control logic 104 and are configured to drive the corresponding subpixels 202, 204, 206, 208 by controlling the light passing through the respective filters 228, 230, 232, 234 according to the control signals 108. The display panel may include any other suitable component, such as one or more glass substrates, polarization layers, or a touch panel, as known in the art.

As shown in FIG. 2A, each of the plurality of subpixels 202, 204, 206, 208 is constituted by at least a filter, a corresponding electrode, and the liquid crystal region between the corresponding filter and electrode. Filters 228, 230, 232, 234 may be formed of a resin film in which dyes or pigments having the desired color are contained. Depending on the characteristics (e.g., color, thickness, etc.) of the respective filter, a subpixel may present a distinct color and brightness. In this example, two adjacent subpixels may constitute one pixel for display. For example, the subpixels A 202 and B 204 may constitute a pixel 246, and the subpixels C 206 and D 208 may constitute another pixel 248. Here, since the display data 106 is usually programmed at the pixel level, the two subpixels of each pixel or the multiple subpixels of several adjacent pixels may be addressed collectively by subpixel rendering to present the brightness and color of each pixel, as designated in display data 106, with the help of subpixel rendering. However, it is understood that, in other examples, display data 106 may be programmed at the subpixel level such that display data 106 can directly address individual subpixel without the need of subpixel rendering. Because it usually requires three primary colors (red, green, and blue) to present a full color, specifically designed subpixel arrangements are provided below in detail for the display panel 102 to achieve an appropriate apparent color resolution.

Figure 2B:
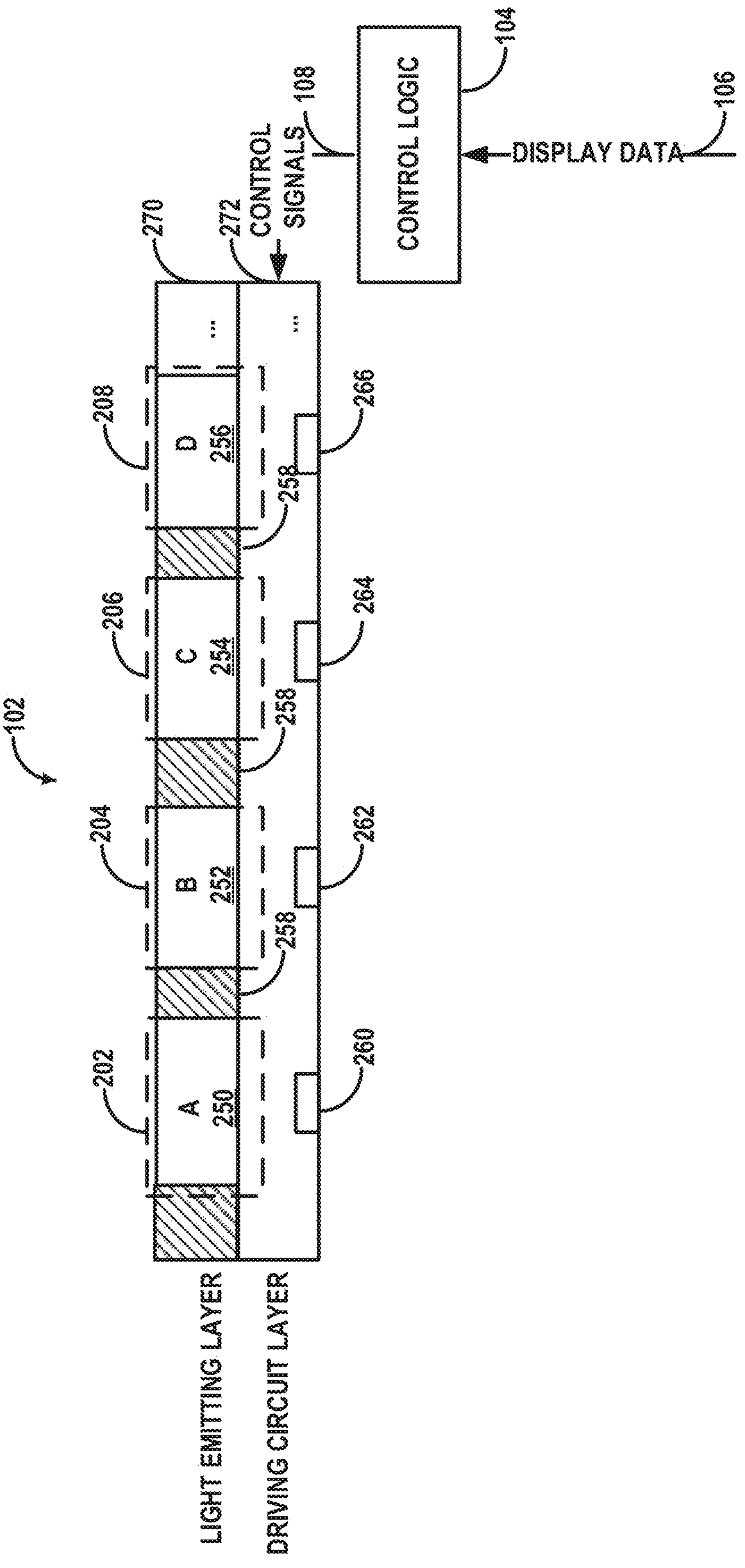

FIG. 2B is a side-view diagram illustrating one example of display panel 102 including subpixels 202, 204, 206, and 208. Display panel 102 may be any suitable type of display, for example, OLED displays, such as an active-matrix OLED (AMOLED) display, or any other suitable display. Display panel 102 may include a display panel operatively coupled to control logic 104. The example shown in FIG. 2B illustrates a side-by-side (a.k.a. lateral emitter) OLED color patterning architecture in which one color of light-emitting material is deposited through a metal shadow mask while the other color areas are blocked by the mask.

In this embodiment, display panel includes light emitting layer 270 and a driving circuit layer 272. As shown in FIG. 2B, light emitting layer 270 includes a plurality of light emitting elements (e.g., OLEDs) 250, 252, 254, and 256, corresponding to a plurality of subpixels 202, 204, 206, and 208, respectively. A, B, C, and D in FIG. 2B denote OLEDs in different colors, such as but not limited to, red, green, blue, yellow, cyan, magenta, or white. Light emitting layer 270 also includes a black array 258 disposed between OLEDs 250, 252, 254, and 256, as shown in FIG. 2B. Black array 258, as the borders of subpixels 202, 204, 206, and 208, is used for blocking light coming out from the parts outside OLEDs 250, 252, 254, and 256. Each OLED 250, 252, 254, and 256 in light emitting layer 270 can emit light in a predetermined color and brightness.

In this embodiment, driving circuit layer 272 includes a plurality of pixel circuits 260, 262, 264, and 268, each of which includes one or more thin film transistors (TFTs), corresponding to OLEDs 250, 252, 254, and 256 of subpixels 202, 204, 206, and 208, respectively. Pixel circuits 260, 262, 264, and 268 may be individually addressed by control signals 108 from control logic 104 and configured to drive corresponding subpixels 202, 204, 206, and 208, by controlling the light emitting from respective OLEDs 250, 252, 254, and 256, according to control signals 108. Driving circuit layer 216 may further include one or more drivers (not shown) formed on the same substrate as pixel circuits 260, 262, 264, and 268. The on-panel drivers may include circuits for controlling light emitting, gate scanning, and data writing, as described below in detail. Scan lines and data lines are also formed in driving circuit layer 216 for transmitting scan signals and data signals, respectively, from the drivers to each pixel circuit 260, 262, 264, and 268. Display panel may include any other suitable component, such as one or more glass substrates, polarization layers, or a touch panel (not shown). Pixel circuits 260, 262, 264, and 268 and other components in driving circuit layer 272 in this embodiment are formed on a low-temperature polycrystalline silicon (LTPS) layer deposited on a glass substrate, and the TFTs in each pixel circuit 260, 262, 264, and 268 are p-type transistors (e.g., PMOS LTPS-TFTs). In some embodiments, the components in driving circuit layer 272 may be formed on an amorphous silicon (a-Si) layer, and the TFTs in each pixel circuit may be n-type transistors (e.g., NMOS TFTs). In some embodiments, the TFTs in each pixel circuit may be organic TFTs (OTFT) or indium gallium zinc oxide (IGZO) TFTs.

As shown in FIG. 2B, each subpixel 202, 204, 206, and 208 is formed by at least an OLED 250, 252, 254, and 256 driven by a corresponding pixel circuit 260, 262, 264, and 268. Each OLED may be formed by a sandwich structure of an anode, an organic light-emitting layer, and a cathode. Depending on the characteristics (e.g., material, structure, etc.) of the organic light-emitting layer of the respective OLED, a subpixel may present a distinct color and brightness. Each OLED 250, 252, 254, and 256 in this embodiment is a top-emitting OLED. In some embodiments, the OLED may be in a different configuration, such as a bottom-emitting OLED. In one example, one pixel may consist of three subpixels, such as subpixels in the three primary colors (red, green, and blue) to present a full color. In another example, one pixel may consist of four subpixels, such as subpixels in the three primary colors (red, green, and blue) and the white color. In still another example, one pixel may consist of two subpixels. For example, subpixels A 202 and B 204 may constitute one pixel, and subpixels C 206 and D 208 may constitute another pixel. Here, since display data 106 is usually programmed at the pixel level, the two subpixels of each pixel or the multiple subpixels of several adjacent pixels may be addressed collectively by SPRs to present the appropriate brightness and color of each pixel, as designated in display data 106 (e.g., pixel data). However, it is to be appreciated that, in some embodiments, display data 106 may be programmed at the subpixel level such that display data 106 can directly address individual subpixel without SPRs. Because it usually requires three primary colors to present a full color, specifically designed subpixel arrangements may be provided for display panel in conjunction with SPR algorithms to achieve an appropriate apparent color resolution.

Although FIG. 2A and FIG. 2B are illustrated as an LCD display and an OLED display, it is to be appreciated that they are provided for an exemplary purpose only and without limitations. In some embodiments, the display panel driving scheme disclosed herein may be applied to microLED displays in which each subpixel includes a microLED. The display panel driving scheme disclosed herein may be applied to any other suitable displays in which each subpixel includes a light emitting element.

Figure 3:
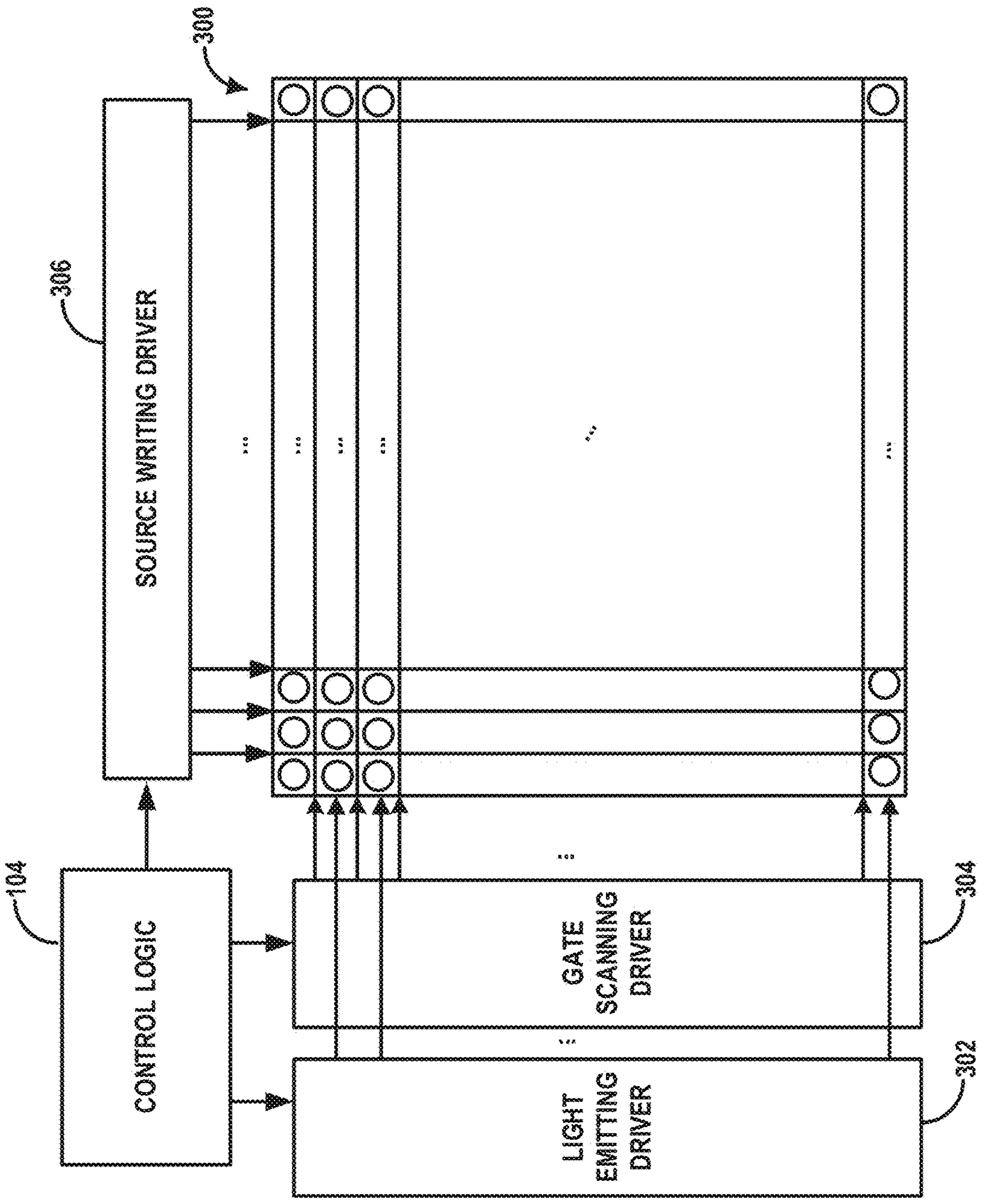
FIG. 3 is a plan-view diagram illustrating the display shown in FIG. 1 including multiple drivers in accordance with an embodiment.

FIG. 3 is a block diagram illustrating display panel 102 shown in FIG. 1 including multiple drivers, for example, driving unit 203 in FIG. 2A, in accordance with some embodiments. display panel 102 in this embodiment includes an active region 300 having a plurality of subpixels (e.g., each including an LCD, an OLED, or microLED), a plurality of pixel circuits (not shown), and multiple on-panel drivers including light emitting driver 302, a gate scanning driver 304, and a source writing driver 306. Light emitting driver 302, gate scanning driver 304, and source writing driver 306 are operatively coupled to control logic 104 and configured to drive the subpixels in active region 300 based on control signals 108 provided by control logic 104.

In some embodiments, control logic 104 is an integrated circuit (but may alternatively include a state machine made of discrete logic and other components), which provides an interface function between processor 114/memory 116 and display panel 102. Control logic 104 may provide various control signals 108 with suitable voltage, current, timing, and de-multiplexing, to control display panel 102 to show the desired text or image. Control logic 104 may be an application-specific microcontroller and may include storage units such as RAM, flash memory, EEPROM, and/or ROM, which may store, for example, firmware and display fonts. In this embodiment, control logic 104 includes a data interface and a control signal generating sub-module. The data interface may be any serial or parallel interface, such as but not limited to, display serial interface (DSI), display pixel interface (DPI), and display bus interface (DBI) by the Mobile Industry Processor Interface (MIPI) Alliance, unified display interface (UDI), digital visual interface (DVI), high-definition multimedia interface (HDMI), and DisplayPort (DP). The data interface in this embodiment is configured to receive display data 106 and any other control instructions 118 or test signals from processor 114/memory 116. The control signal generating sub-module may provide control signals 108 to on-panel drivers 302, 304, and 306. Control signals 108 control on-panel drivers 302, 304, and 306 to drive the subpixels in active region 300 by, in each frame, scanning the subpixels to update display data and causing the subpixels to emit light to present the updated display image.

Apparatus 100 can be configured to calibrate a mapping correlation between voltage (e.g., gate voltage) applied on a light-emitting element (e.g., an LCD or an OLED) of a pixel in display panel 102 and the grayscale values displayed by a pixel that includes the light-emitting element (e.g., when different gate voltages are applied on the light-emitting element). The calibration process may be performed by processor 114 (e.g., illustrated in FIG. 4) or control logic 104. In various embodiments, processor 114 may perform a pre-stored computer program from memory 116 or from input device 112 or receive input instructions 120 from input device 112 to execute the calibration. The calibration process may also be performed by other dedicated devices/modules (not shown in FIG. 1).

Figure 4:
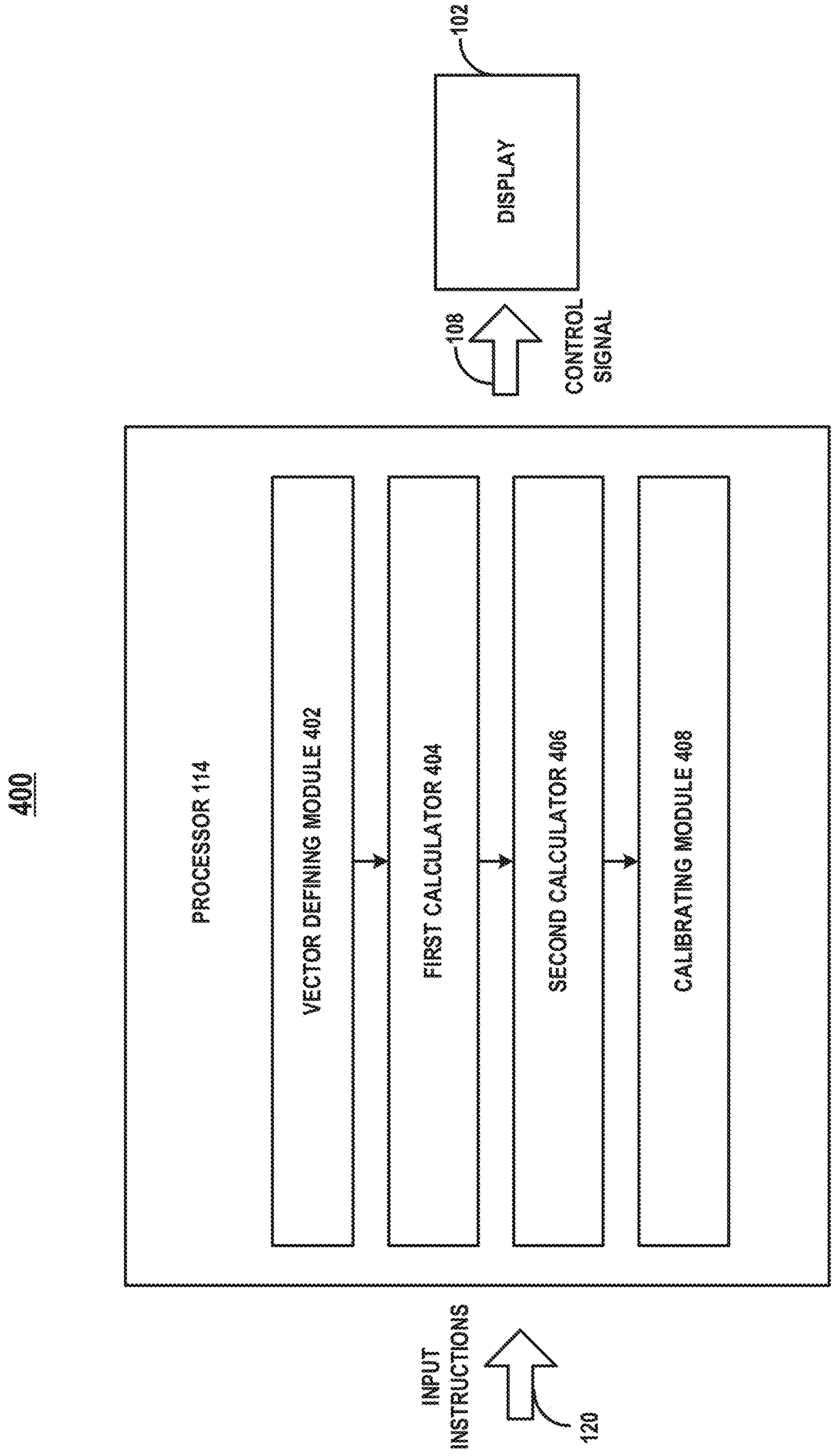
FIG. 4 is a block diagram illustrating a system including a processor and a display panel in accordance with an embodiment.

FIG. 4 is a block diagram illustrating a display system 400 including display panel 102 and a processor 114 configured to perform the calibration in accordance with an embodiment. Processor 114 is configured to, upon executing instructions, define a calibration vector with a source pixel, a vector volume, and a calibration range, calculate a distance between a pixel to be calibrated and the source pixel, calculate a calibration amount based on the distance and the vector volume, and calibrate the pixel to be calibrated based on the calibration amount and the calibration vector. Processor 114 may be any processor that can generate display data 106, e.g., pixel data/values, in each frame and provide display data 106 to control logic 104. Processor 114 may be, for example, a GPU, AP, APU, or GPGPU. Processor 114 may also generate other data, such as but not limited to, control signals 108 or test signals, and provide them to control logic 104. In some implementations, the calibration may be performed by control logic 104 upon instructions. Control logic 104 includes a data receiver that receives display data 106 and/or control instructions 118 from processor 114, and a post-processing module coupled to data receiver to receive any data/instructions and convert them to control signals 108.

In this embodiment, processor 114 includes a vector defining module 402, a first calculator 404, a second calculator 406, and a calibrating module 408. Vector defining module 402 is configured to define one or more calibration vectors used for calibration. Unlike a 3D LUT, a calibration vector has three parameters: a source pixel, a vector volume, and a calibration range. The source pixel is a three-dimensional parameter configured to determine a central point for calibration. The vector volume is a three-dimensional parameter configured to determine a maximal volume for calibration. The calibration range is a four-dimensional parameter configured to determine a calibration scope, and pixels within the calibration scope are calibrated by the calibration vector.

Figure 6:
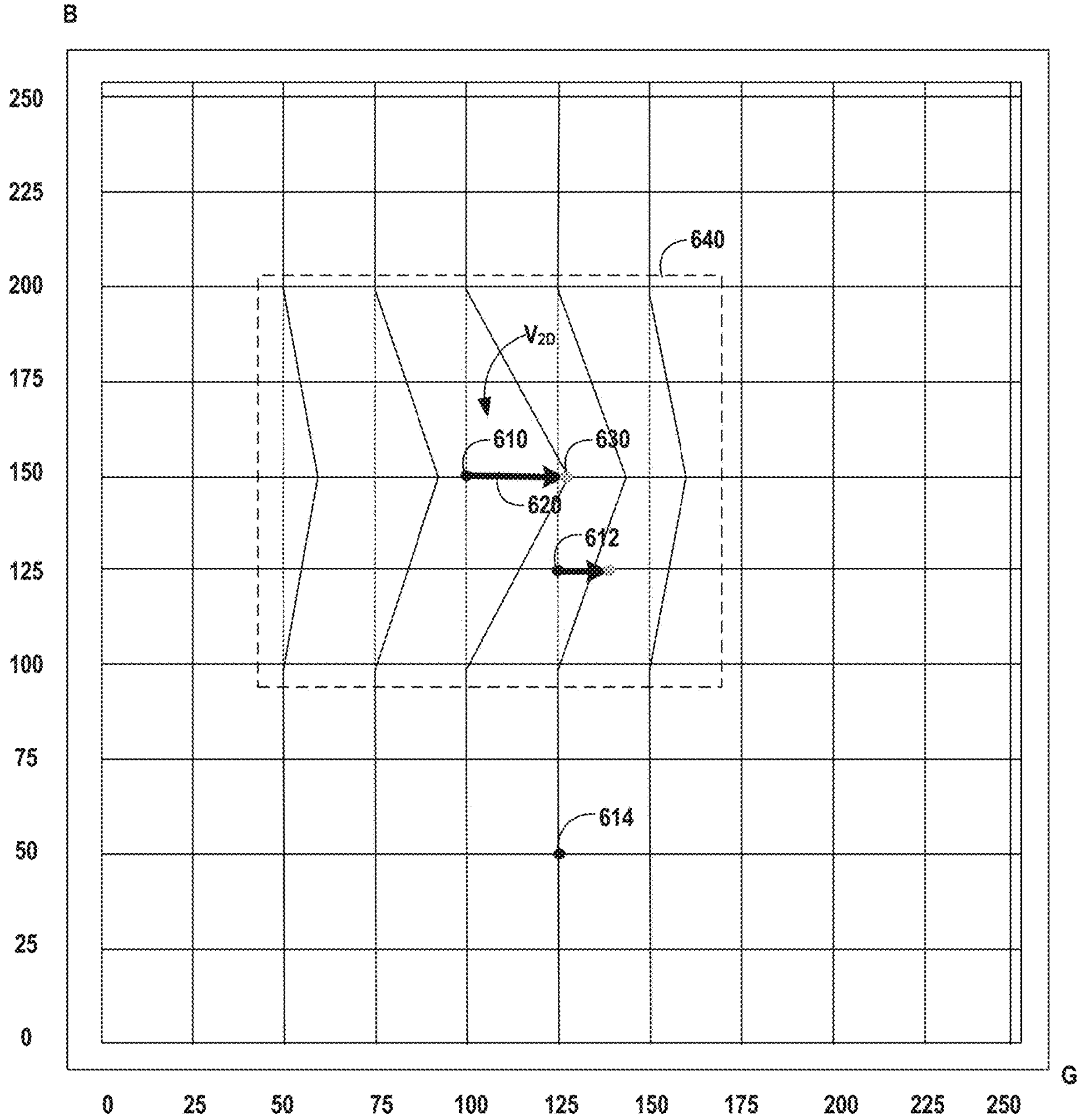
FIG. 6 is an illustration diagram of a transmission grid of a calibration vector in accordance with an embodiment.

A two-dimension (2D) calibration vector is taken as an example to illustrate the principle of the calibration vectors. FIG. 6 illustrates a 2-D color space (G, B). As shown in FIG. 6, a 2D calibration vector $V_{2D}$ has three parameters: a source pixel 610, a vector volume 620, and a calibration range 640.

Source pixel 610 is a two-dimensional parameter ($G_{scr}$, $B_{scr}$) configured to determine a central point for calibration, where $G_{scr}$ is a grayscale value of a green channel of the source pixel and $B_{scr}$ is a grayscale value of a blue channel of the source pixel. In the present implementation, grayscale value of source pixel 610 is (100, 150). Source pixel 610 defines a start point for calibration, as shown in FIG. 6.

Vector volume 620 is a two-dimensional parameter ($V_G$, $V_B$) configured to determine a maximal volume for calibration. $V_G$ is a calibration value of a green channel of the source pixel and $V_B$ is a calibration value of a blue channel of the source pixel. In the present implementation, vector volume 620 is (30, 0). Vector volume 620 defines a degree for calibration, as shown in FIG. 6. Grayscale value of a calibrated pixel 630 is a two-dimensional parameter ($G'_{Cal}$, $B'_{Cal}$), which is determined by source pixel 610 and vector volume 620, i.e., $G'_{Cal}=G_{Src}+V_G$, and $B'_{Cal}=B_{Src}+V_B$. In the present implementation, calibrated pixel 630 is (130, 150).

Calibration range 640 is a three-dimensional parameter ($V_{Range}$, $S_G$, $S_B$) configured to determine a calibration scope, pixels within the calibration scope are calibrated by the calibration vector. $V_{Range}$ is a preset distance between the pixel to be calibrated and the source pixel, the pixel to be calibrated is calibrated by the calibration vector when the distance between the pixel to be calibrated and the source pixel is smaller than $V_{Range}$. In the present implementation, $V_{Range}$ is 100, i.e., a pixel whose distance from source pixel greater than 100 will not be calibrated. For example, a distance between a first pixel 612 and source pixel 610 is smaller than 100, and first pixel 612 locates within calibration range 640. Thus, first pixel 612 will be calibrated. For example, a distance between a second pixel 614 and source pixel 610 is bigger than 100, and second pixel 614 locates outside calibration range 640. Thus, second pixel 614 will not be calibrated.

In the present implementation, the green channel and the bule channel share the same $V_{Range}$. $S_G$ is a calculation factor of a green channel when calculating the distance between the pixel to be calibrated and the source pixel, and $S_B$ is a calculation factor of a blue channel when calculating the distance between the pixel to be calibrated and the source pixel. $S_G$ and $S_B$ are preset based on a calibration target.

Figure 7:
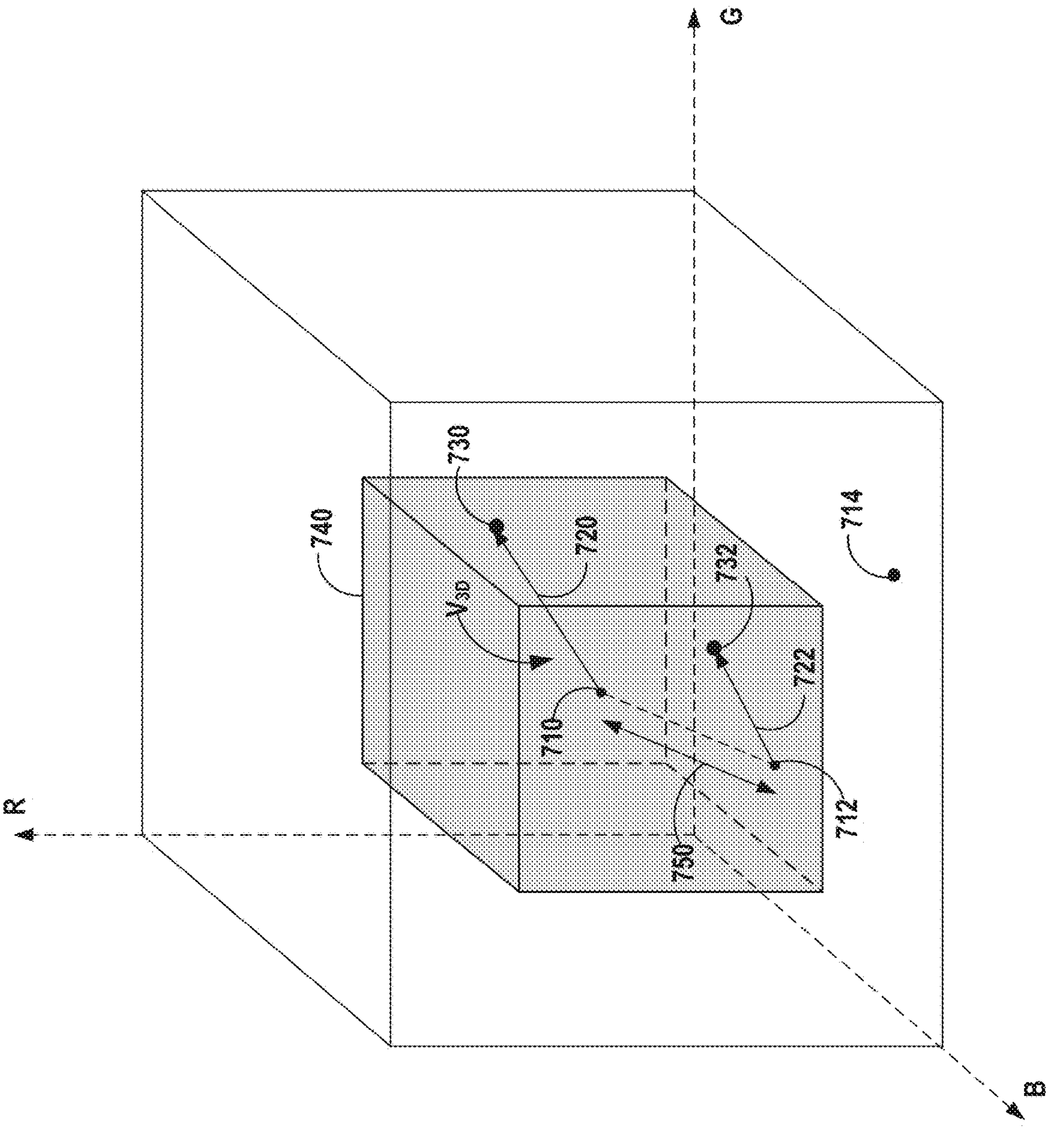
FIG. 7 is an illustration diagram of a transmission space of a calibration vector in accordance with an embodiment.

The principle of how calibration vectors work in a display panel is illustrated in the above implementation in a 2D color space. FIG. 7 illustrates how the calibration vectors work in a 3D color space, i.e., the most popular color space—the (R, G, B) space. As shown in FIG. 7, a 3D calibration vector $V_{3D}$ has three parameters: a source pixel 710, a vector volume 720, and a calibration range 740.

Source pixel 710 is a three-dimensional parameter ($R_{scr}$, $G_{scr}$, $B_{scr}$) configured to determine a central point for calibration, and $R_{scr}$ is a grayscale value of a red channel of the source pixel. In the present implementation, the grayscale value of source pixel 710 is (100, 100, 150). Source pixel 710 defines a start point for calibration, as shown in FIG. 7. Vector volume 720 is a three-dimensional parameter ($V_R$, $V_G$, $V_B$) configured to determine a maximal volume for calibration, and $V_R$ is a calibration value of a red channel of the source pixel. In the present implementation, vector volume 720 is (25, 30, 10). Vector volume 720 defines a degree for calibration, as shown in FIG. 7. Grayscale value of a calibrated pixel 730 is a three-dimensional parameter ($R'_{Cal}$, $G'_{Cal}$, $B'_{Cal}$), which is determined by source pixel 710 and vector volume 720, i.e., $R'_{Cal}=R_{Src}+V_R$, $G'_{Cal}=G_{Src}+V_G$, and $B'_{Cal}=B_{Src}+V_B$. In the present implementation, calibrated pixel 730 is (125, 130, 150).

Calibration range 740 is a three-dimensional parameter ($V_{Range}$, $S_R$, $S_G$, $S_B$) configured to determine a calibration scope, pixels within the calibration scope are calibrated by calibration vector $V_{3D}$. $V_{Range}$ is a preset distance between the pixel to be calibrated and the source pixel 710, and the pixel to be calibrated is calibrated by the calibration vector when the distance between the pixel to be calibrated and the source pixel 710 is smaller than $V_{Range}$. In the present implementation, $V_{Range}$ is 100, i.e., a pixel whose distance from source pixel 710 is greater than 100 will not be calibrated. For example, a distance between a first pixel 712 and source pixel 710 is smaller than 100, and first pixel 712 locates within calibration range 740. Thus, first pixel 712 will be calibrated. For example, a distance between a second pixel 714 and source pixel 710 is bigger than 100, and second pixel 714 locates outside calibration range 740. Thus, second pixel 714 will not be calibrated. In the present implementation, the red channel, the green channel, and the blue channel share the same $V_{Range}$, and thus the scope of calibration is a cube. $S_R$ is a calculation factor of a red channel when calculating the distance between the pixel to be calibrated and the source pixel. $S_R$, $S_G$ and $S_B$ are preset based on a calibration target.

Referring to FIG. 4, first calculator 404 is configured to calculate a distance between a pixel to be calibrated and the source pixel. Taking the (R, G, B) color space in FIG. 7 as an example, vector volume 720 defines the maximal volume of calibration, i.e., a pixel having a same grayscale value as source pixel 710 will be calibrated by vector volume 720. The more a pixel deviates from source pixel 710, the less it will be calibrated. As shown in FIG. 7, a calibration amount 722 configured to calibrate first pixel 712 is less than vector volume 720. When a pixel deviates from source pixel 710 too much, the vector volume will be zero, which means the pixel will not be calibrated, like second pixel 714. By designing source pixel 710, vector volume 720, and calibration range 740 precisely, the present disclosure can achieve various calibrations based on the need of the display system with a small data storage.

Taking first pixel 712 as an example, to perform calibration, it is necessary to calculate a distance 750 between first pixel 712 and source pixel 710 because distance 750 is negatively correlated with a calibration amount 722 applied on first pixel 712. Distance 750 is calculated based on grayscale values of first pixel 712, source pixel 710, and calculation factors of the color space $S_R$, $S_G$, $S_B$ through a preset calculation module, for example, the ellipsoidal distance model, cube distance model, sphere distance model, etc. In an implementation, for each pixel to be calibrated, an ellipsoidal distance model is employed to calculate the distance between the pixel and source pixel 710 based on the following formula in which ($R_i$, $G_i$, $B_i$) is the grayscale value of the pixel to be calibrated.

$$\text{Distance} = \sqrt{S_R \times (R_i - R_{Src})^2 + S_G \times (G_i - G_{Src})^2 + S_B \times (E_i - E_{Src})^2}.$$

In the present implementation, the grayscale value of first pixel 712 is (50, 80, 110), the grayscale value of source pixel 710 is (100, 100, 150), $S_R=S_G=S_B=2$, distance 750 is 95. Source pixel 710, vector volume 720, and calibration range 740 can be designed and preset as any value to meet the needs of the display system. In some implementations, $S_R=S_G=S_B=1$, then distance 750 is 67, i.e., the Euclidean distance. In some implementations, $S_R$, $S_G$, $S_B$ are different, for example, $S_R=0$, $S_G=1$, $S_B=2$, which means no calibration in the red channel and distance 750 is 20.

In some implementations, for each pixel to be calibrated, a cube distance model is employed to calculate the distance between the pixel and source pixel 710 based on the following formula in which ($R_i$, $G_i$, $B_i$) is the grayscale value of the pixel to be calibrated.

$$\text{Distance} = \text{Min}(S_R \times (R_i - R_{Src}), S_G \times (G_i - G_{Src}), S_B \times (B_i - B_{Src})).$$

For each pixel to be calibrated, the distance is closely related to the source pixel, the calibration range, and the calibration module. It is to be appreciated that the above implementations are provided for an exemplary purpose only and without limitations.

Referring to FIG. 4 and FIG. 7, second calculator 406 is configured to calculate a calibration amount 722 based on distance 750 and the vector volume 720. As described above, calibration amount 722 applied on first pixel 712 is negatively correlated with distance 750.

Two steps are needed to calculate calibration amount 722.

First, calculate a calibration weight based on the distance between a pixel to be calibrated and the source pixel, i.e., distance 750. In the present implementation, calibration weight is calculated based on the following formula:

$$\text{Weight} = \begin{cases} 0 & \text{if Distance} > V_{Range} \\ \dfrac{1 - \text{Distance}}{V_{Range}} & \text{else} \end{cases}.$$

Second, calculate calibration amount 722 based on calibration weight and vector volume 720. Calibration amount 722 is a three-dimensional parameter ($\Delta V_R$, $\Delta V_G$, $\Delta V_B$), where $\Delta V_R$ is a calibration amount of a red channel of the source pixel, $\Delta V_G$ is a calibration amount of a green channel of the source pixel, and $\Delta V_B$ is a calibration amount of a blue channel of the source pixel. In the present implementation, $\Delta V_R=V_R\times\text{Weight}$, $\Delta V_G=V_G\times\text{Weight}$, $\Delta V_B=V_B\times\text{Weight}$. The calculation method to calculate the calibration weight and the calibration amount are provided for an exemplary purpose only and without limitations.

After calibration amount 722 is confirmed, calibrating module 408 is configured to calibrate first pixel 712 based on calibration amount 722 and calibration vector $V_{3D}$. The grayscale value of a first calibrated pixel 732 is a three-dimensional parameter ($R_{Cal}$, $G_{Cal}$, $B_{Cal}$), which is determined by first pixel 712 and calibration amount 722, i.e., $R_{Cal}=R_i+\Delta V_R$, $G_{Cal}=G_i+\Delta V_G$, and $B_{Cal}=B_i+\Delta V_B$. In an implementation, the grayscale value of source pixel 710 is (100, 100, 150), and calibration range 740 is (100, 1, 1, 1). For first pixel 712, the grayscale value of first pixel 712 is (50, 80, 110), Euclidean distances module is used to calculate distance 750, which is 67, and the grayscale value of first calibrated pixel 732 is calibrated to (17, 47, 51). In other implementations, the grayscale value of first calibrated pixel 732 will change with the change of the parameters used for calibration. The implementations are provided for an exemplary purpose only and without limitations.

Calibration vector $V_{3D}$ may be a marginal vector for calibrating pixels of the pixel array, a white balance vector for compensating the pixels of the pixel array, or a local vector for calibrating at least one of the pixels of the pixel array, etc.

Marginal vectors are used for global calibration of RGB space to adjust the overall color according to gamut space characteristics. Referring to Table 1, an example of a set of marginal vectors is illustrated. The set of marginal vectors includes six groups of marginal vectors, marginal vectors in a same group share the same source pixel and calibration range. Table 1 shows the source pixels and calibration ranges of the six groups of marginal vectors. Marginal vectors are global vectors as they are designed to calibrate the overall color of the display system, and thus the range of every marginal vector covers the whole RGB space, and the source pixels are located on vertices of the RGB space. In other implementations, eight groups of marginal vectors are provided to achieve a precise calibration.

TABLE 1

| No. | Source Pixel | $V_{Range}$ |
|---|---|---|
| 0 | (255, 0, 0) | 255 |
| 1 | (0, 255, 0) | 255 |
| 2 | (0, 0, 255) | 255 |
| 3 | (0, 255, 255) | 255 |
| 4 | (255, 0, 255) | 255 |
| 5 | (255, 255, 0) | 255 |

For each marginal vector, the source pixels are preset and fixed to define the start points for each vector, as shown in Table 1. The vector volume for each marginal vector can be tailor-made according to the needs of different calibration. The vector volume for each marginal vector can be the same, for example, vector volume of the six vectors are all (10, 10, 10). The vector volume for each marginal vector can be different, for example, vector volume of $V_0$ is (−10, 5, 0), vector volume of $V_1$ is (6, −4, −5), vector volume of $V_2$ is (−10, −5, 0), vector volume of $V_3$ is (0, 10, −5), vector volume of $V_4$ is (10, 5, 10), vector volume of $V_5$ is (−5, −5, −15). Vector volume defines a degree for each vector, and can be preset and adjusted according to the actual needs of each calibration.

$V_{Range}$ is a preset distance between the pixel to be calibrated and the source pixel, for each marginal vector, $V_{Range}$ is fixed as 255 to cover the whole RGB space. $S_R$ is a calculation factor of a red channel when calculating the distance between the pixel to be calibrated and the source pixel. $S_G$ is a calculation factor of a green channel when calculating the distance between the pixel to be calibrated and the source pixel. $S_B$ is a calculation factor of a blue channel when calculating the distance between the pixel to be calibrated and the source pixel. $S_R$, $S_G$ and $S_B$ are preset based on a calibration target. As an example, in the present implementation, $S_R=S_G=S_B=1$, and the cube distance model is employed to calculate the distance between a pixel ($R_i$, $G_i$, $B_i$) and the source pixel based on the following formula.

$$\text{Distance} = \text{Min}(S_R \times (R_i - R_{Src}),\ S_G \times (G_i - G_{Src}),\ S_B \times (B_i - B_{Src})).$$

For each marginal vector, after the distance is calculated, the calibration amount can be obtained based on the distance and the vector volume respectively. As described above, two steps are needed to calculate the calibration amount. First, calculate the calibration weight based on the distance between a pixel to be calibrated and the source pixel. Second, calculate the calibration amount based on calibration weight and vector volume. Detailed calculation methods are described above and will not repeat here. The calculation methods to calculate the calibration weight and the calibration amount are provided for an exemplary purpose only and without limitations.

As more than one vector is employed in the present implementation, they should be combined to complete the calibration. The six marginal vectors may be placed in a sequential order or a parallel order when combined.

Figure 9A:
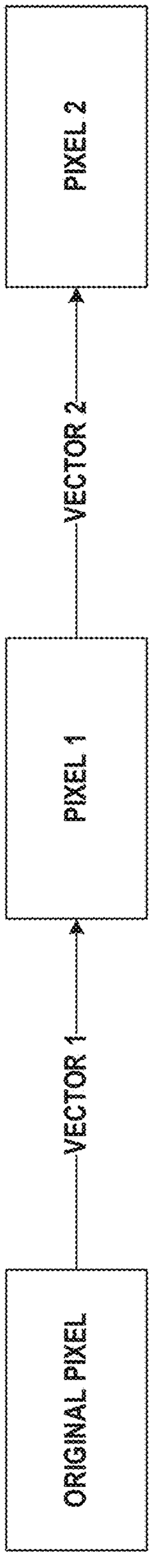
FIG. 9A is a block diagram illustrating a sequential calibration with more than one calibration vectors in accordance with an embodiment.

FIG. 9A shows two calibration vectors placed in a sequential order. The original pixel ($R_{org}$, $G_{org}$, $B_{org}$) is first calibrated by vector 1 to generate a calibrated pixel 1, then pixel 1 is calibrated by vector 2 to generate a calibrated pixel 2. For a plurality of calibration vectors placed in a sequential order, the calibration vectors are superimposed one by one as shown in FIG. 9A. For example, a group of calibration vectors $V_1$ ($R_1$, $G_1$, $B_1$), $V_2$ ($R_2$, $G_2$, $B_2$), . . . , $V_N$ ($R_N$, $G_N$, $B_N$) are provided, and the calibrated pixels $V_{Cal1}$ ($R_{Cal1}$, $G_{Cal1}$, $B_{Cal1}$), $V_{Cal2}$ ($R_{Cal2}$, $G_{Cal2}$, $B_{Cal2}$), . . . , $V_{calN}$ ($R_{calN}$, $G_{calN}$, $B_{calN}$) can be generated through the formula bellow, where $V_{calN}$ ($R_{calN}$, $G_{calN}$, $B_{calN}$) is the final calibrated pixel:

$$\begin{gathered} V_{Cal1} = (R_{Cal1}, G_{Cal1}, B_{Cal1}) = F_{serial}((R_{org}, G_{org}, B_{org}), V_1) \\ V_{Cal2} = (R_{Cal2}, G_{Cal2}, B_{Cal2}) = F_{serial}((R_{Cal1}, G_{Cal1}, B_{Cal1}), V_2) \\ \vdots \\ V_{CalN} = (R_{CalN}, G_{CalN}, B_{CalN}) = F_{serial}((R_{CalN-1}, G_{CalN-1}, B_{CalN-1}), V_N) \end{gathered}$$

Figure 9B:
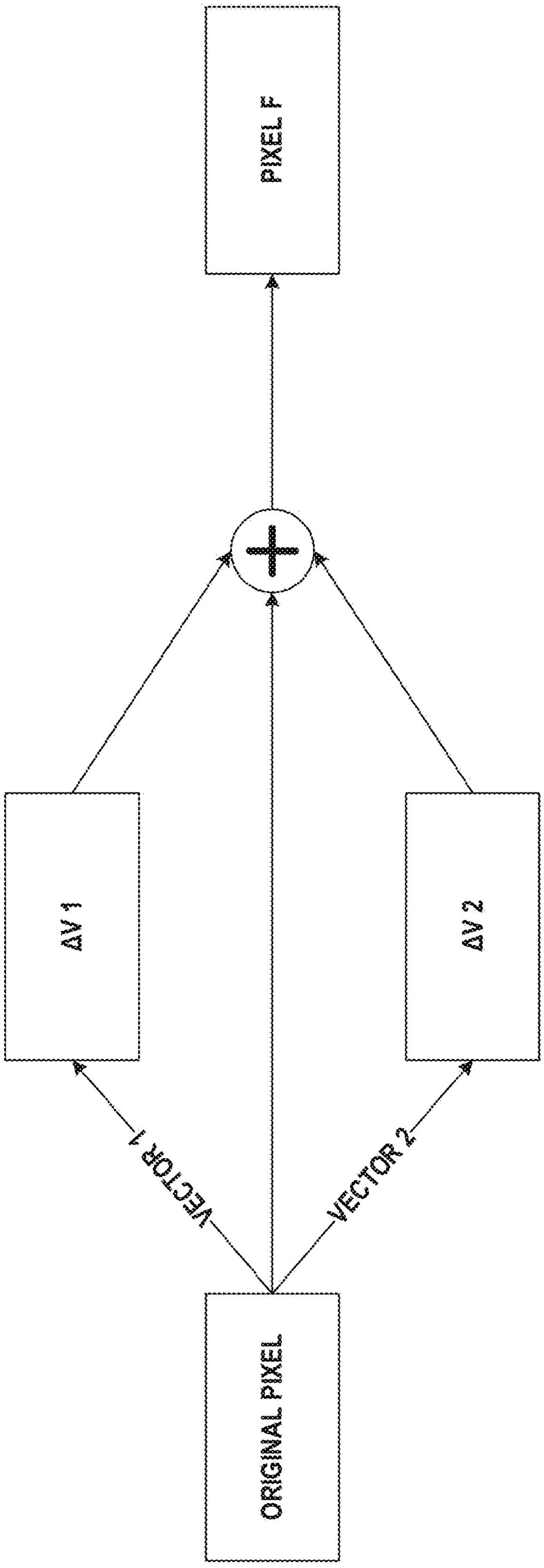
FIG. 9B is a block diagram illustrating a parallel calibration with more than one calibration vector in accordance with an embodiment.

FIG. 9B shows two calibration vectors placed in a parallel order. The original pixel is first calibrated by vector 1 and vector 2, respectively, to generate a calibration amount $\Delta V_1$ and a calibration amount $\Delta V_2$. Then the calibration amount $\Delta V_1$ and the calibration amount $\Delta V_2$ are convolved to obtain the final calibrated pixel F. For each vector, calibration amount $\Delta V$ can be calculated through the formula below:

$$\Delta V = (\Delta V_R, \Delta V_G, \Delta V_B) = F_{parallel}((R_{org}, G_{org}, B_{org}), V).$$

For a group of calibration vectors $V_1$ ($R_1$, $G_1$, $B_1$), $V_2$ ($R_2$, $G_2$, $B_2$), . . . , $V_N$ ($R_N$, $G_N$, $B_N$), a total calibration amount $\Delta V_{total}$ and a final calibrated pixel $V_F$ can be calculated through the formula below:

$$\Delta V_{total} = \sum_{i=1}^{N} F_{parallel}((R_{org}, G_{org}, B_{org}), V_i),$$

$$V_F = (R_F, G_F, B_F) = (R_{org} + \Delta V_{total-R},\ G_{org} + \Delta V_{total-G},\ B_{org} + \Delta V_{total-B}).$$

Figure 8:
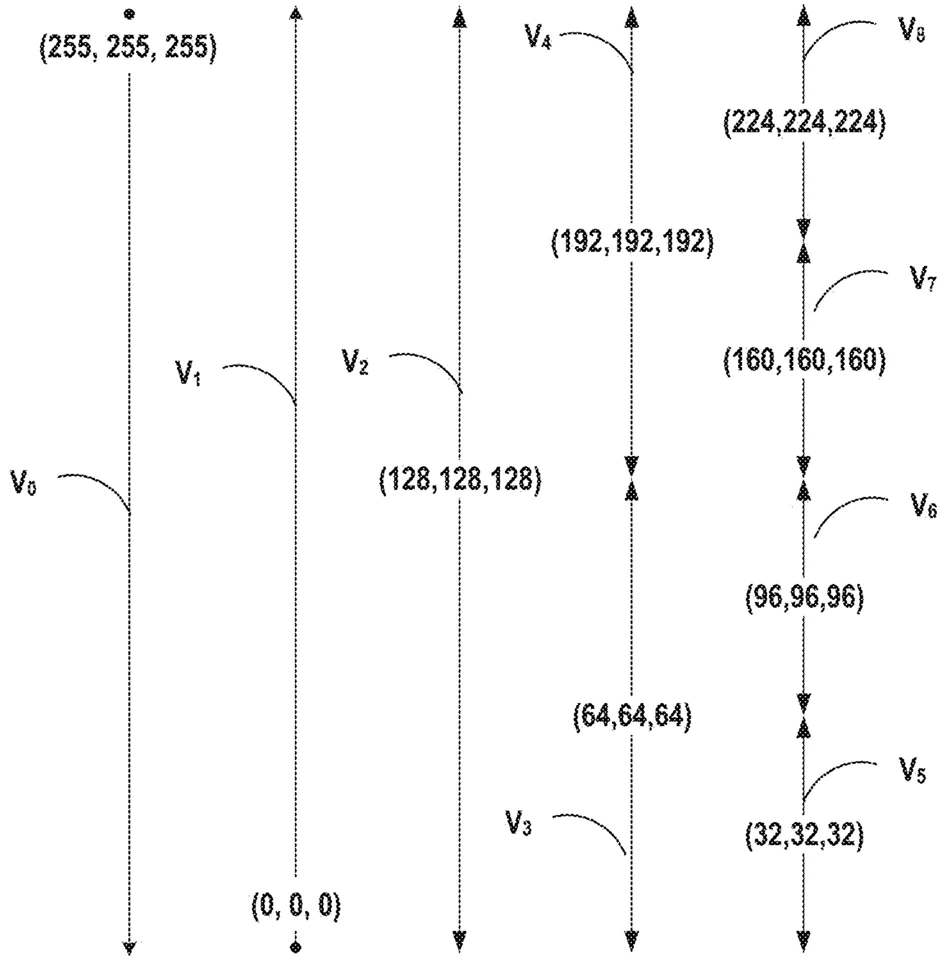
FIG. 8 is an illustration diagram of a group of calibration vectors in accordance with an embodiment.

White balance vectors are used to correct the color profile of white in RGB space. Usually, the grayscale values of a source pixel of a white balance vector in the red channel, the green channel, and the blue channel are the same. Referring to Table 2, an example of a set of white balance is illustrated. The set of white balance vectors includes 9 groups of white balance vectors, and the grayscale values of a source pixel of every white balance vector in the red channel, the green channel, and the blue channel are the same. Table 2 shows the source pixels and calibration ranges of the 9 groups of white balance vectors. White balance vectors are global vectors as they are designed to correct the color profile of white of the display system, and thus a sum of the range of every white balance vector covers the whole RGB space. FIG. 8 is an illustration diagram of the 9 groups of white balance vectors in Table 2. $V_0$, $V_1$ and $V_2$ are three global vectors. $V_0$ and $V_1$ are located in two vertices of the RGB space. $V_{Range}$ of $V_0$ is 255, which means, for $V_0$, the farthest distance between a pixel within the scope of calibration and the source pixel of is 255. As $V_0$ is in a vertex of the RGB space, the farthest distance between any pixel in the RGB space and the source pixel of $V_0$ is less than or equal to 255, $V_0$ is able to cover the whole RGB space. So is $V_1$, $V_2$ is located in the center of the RGB space, $V_{Range}$ of $V_2$ is 128, which means, for $V_2$, the farthest distance between a pixel within the scope of calibration and the source pixel of is 128. As $V_2$ is in the center of the RGB space, the farthest distance between any pixel in the RGB space and the source pixel of $V_2$ is less than or equal to 128, thus $V_2$ is able to cover the whole RGB space. Similarly, $V_3$ and $V_4$ each covers half of the RGB space. $V_5$ to $V_8$ each covers a quarter of the RGB space.

TABLE 2

| No. | Source Pixel | $V_{Range}$ |
|---|---|---|
| 0 | (0, 0, 0) | 255 |
| 1 | (255, 255, 255) | 255 |
| 2 | (128, 128, 128) | 128 |
| 3 | (64, 64, 64) | 64 |
| 4 | (192, 192, 192) | 64 |
| 5 | (32, 32, 32) | 32 |
| 6 | (96, 96, 96) | 32 |
| 7 | (160, 160, 160) | 32 |
| 8 | (224, 224, 224) | 32 |

For each white balance vector, the source pixels are preset and fixed to define the start points for each vector, as shown in Table 2. The vector volume for each white balance vector can be tailor-made according to the needs of different calibration. The vector volume for each marginal vector can be the same, for example, vector volumes of the six vectors are all (30, 30, 30). The vector volume for each marginal vector can be different, for example, vector volume of $V_0$ is (−10, −5, −15), vector volume of $V_1$ is (−10, 5, −15), vector volume of $V_2$ is (10, −5, 0), vector volume of $V_3$ and $V_4$ is (−4, −10, 7), vector volume of $V_5$, $V_6$, $V_7$, and $V_8$ is (−4, −5, 6). Vector volume defines a degree for each vector and can be preset and adjusted according to the actual needs of each calibration.

$V_{Range}$ is a preset distance between the pixel to be calibrated and the source pixel, for each white balance vector, $V_{Range}$ is designed and fixed to cover the whole RGB space. $S_R$ is a calculation factor of a red channel when calculating the distance between the pixel to be calibrated and the source pixel. $S_G$ is a calculation factor of a green channel when calculating the distance between the pixel to be calibrated and the source pixel. $S_B$ is a calculation factor of a blue channel when calculating the distance between the pixel to be calibrated and the source pixel. $S_R$, $S_G$ and $S_B$ are preset based on a calibration target. As an example, in the present implementation, $S_R=S_G=S_B=1$, and the cube distance model is employed to calculate the distance between a pixel ($R_i$, $G_i$, $B_i$) and the source pixel based on the following formula.

$$\text{Distance} = \text{Min}(S_R \times (R_i - R_{Src}),\ S_G \times (G_i - G_{Src}),\ S_B \times (B_i - B_{Src})).$$

For each vector, after the distance is calculated, the calibration amount can be obtained based on the distance and the vector volume respectively. As described above, two steps are needed to calculate the calibration amount. First, calculate the calibration weight based on the distance between a pixel to be calibrated and the source pixel. Second, calculate the calibration amount based on calibration weight and vector volume. Detailed calculation methods are described above and will not be repeated here. The calculation methods to calculate the calibration weight and the calibration amount are provided for an exemplary purpose only and without limitations.

As more than one vector is employed in the present implementation, they should be combined to complete the calibration. The six marginal vectors may be placed in a sequential order or a parallel order when combined. The detailed calculation methods are described above and will not be repeated here.

Local vectors can be customized according to requirements, generally as a complement to the margin vectors or white balance vectors. Local vectors can also be tailor-made based on a specific color according to actual needs. In implementations discussed above, a plurality of calibration vectors are combined to complete a specific calibration.

Figure 10A:
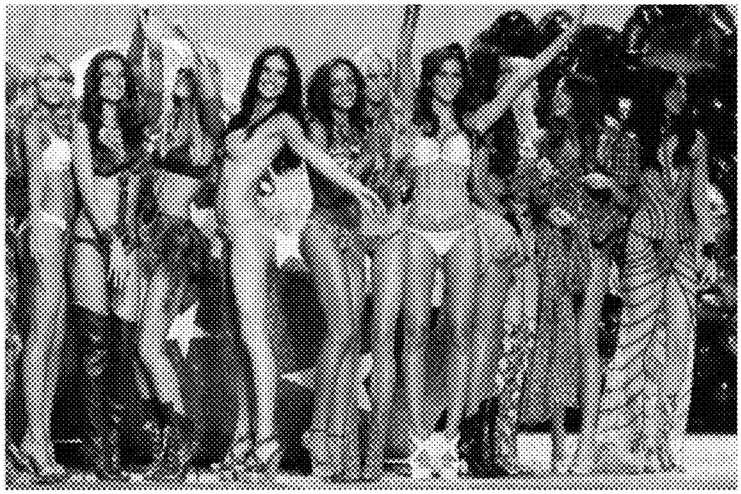
FIG. 10A is an exemplary picture to be calibrated in accordance with an embodiment.
Figure 10B:
FIG. 10B is an illustration of a calibration range in FIG. 10A in accordance with an embodiment.
Figure 10C:
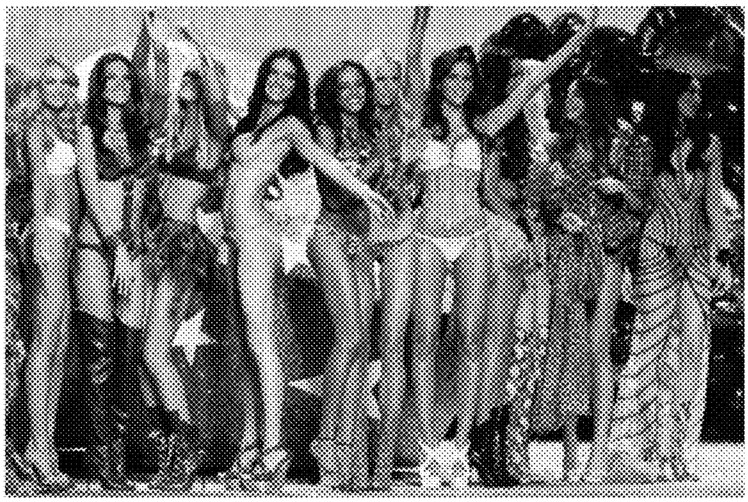
FIG. 10C is an exemplary picture of FIG. 10A after calibration in accordance with an embodiment.

FIG. 10A and FIG. 10C show the original picture and the calibrated picture, respectively, in accordance with an embodiment. FIG. 10B shows a calibration range of a calibration vector used in the calibration from FIG. 10A to FIG. 10C. Calibration vectors can achieve precise calibration within a specific color scope without affecting the rest part of the picture. For example, for FIG. 10A, the skins of people need to be calibrated while the environment keep original. Thus, a group of local calibration vectors targeting the color of skins can be defined. For example, three local calibration vectors may be defined to calibrate people with white skin, yellow skin, and black skin, respectively. Once a calibration vector is defined, it can be stored in a register by vector defining module 402, and the stored calibration vectors can be retrieved by the processor repeatedly without redefining. By employing one or more calibration vectors, precise and complex calibration can be performed to specific color within a specific scope with a small data storage. Calibration vectors can achieve the same effects of 3D LUT with ignorable data storage.

Figure 11:
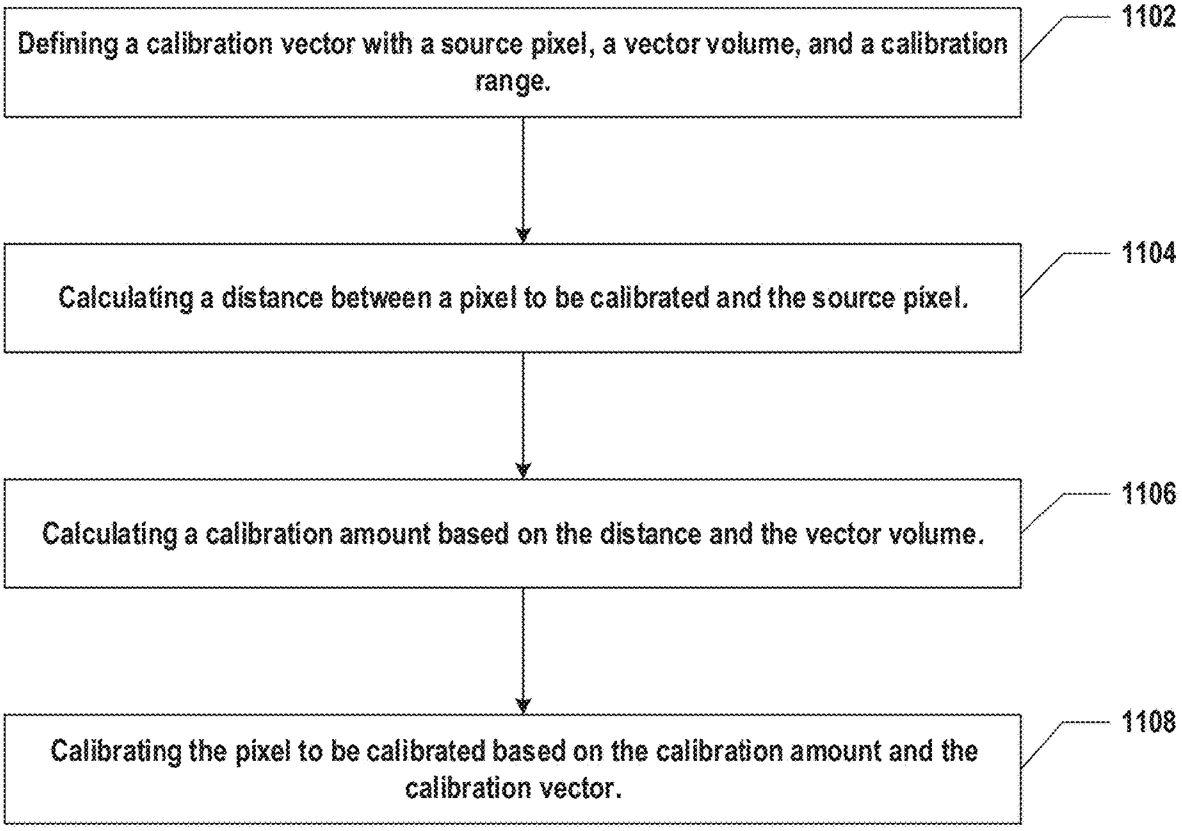
FIG. 11 is a depiction of an exemplary method for calibrating a display panel in accordance with an embodiment.

Referring to FIG. 11, a method 1100 for calibrating a display panel having a pixel array is provided. It will be described with reference to the above figures. However, any suitable circuit, logic, unit, module, or sub-module may be employed. Method 1100 can be performed by any suitable circuit, logic, unit, module, or sub-module that can comprise hardware (e.g., circuitry, dedicated logic, programmable logic, microcode, etc.), software (e.g., instructions executing on a processing device), firmware, or a combination thereof. In some embodiments, operations 1102-1108 of method 1100 may be performed in various orders. In an example, operations 1102-1108 may be performed sequentially, as shown in FIG. 11. The orders of the operations should not be limited to the embodiments of the present disclosure.

Starting at operation 1102, a calibration vector with a source pixel, a vector volume, and a calibration range are defined by processor 114. The source pixel is a three-dimensional parameter configured to determine a central point for calibration. The source pixel defines a starting point for calibration. The vector volume is a three-dimensional parameter configured to determine a maximal volume for calibration. The vector volume defines a degree for calibration. The calibration range is a four-dimensional parameter configured to determine a calibration scope, and pixels within the calibration scope are calibrated by the calibration vector. If the distance between the pixel to be calibrated and source pixel is smaller than the calibration range, the pixel will be calibrated, and vice versa. Calibration vector may be a marginal vector for calibrating pixels of the pixel array, a white balance vector for compensating the pixels of the pixel array, or a local vector for calibrating at least one of the pixels of the pixel array, etc. One or more calibration vectors can be defined and used for calibration to meet the needs of the display system. Details for defining the calibration vectors have been described above and will not be repeated here.

Method 1100 then proceeds to operation 1104, in which a distance between a pixel to be calibrated and the source pixel is calculated. To perform calibration, it is necessary to calculate the distance between the pixel to be calibrated and the source pixel because the distance is negatively correlated with the calibration amount applied to the pixel to be calibrated. The distance is calculated based on grayscale values of the pixel to be calibrated, the source pixel, and the calculation range through a preset calculation module, for example, an ellipsoidal distance model, a cube distance model, a sphere distance model, etc.

Method 1100 then proceeds to operation 1106, in which a calibration amount based on the distance and the vector volume is calculated. Two steps are needed to calculate the calibration amount. First, calculate a calibration weight based on the distance between a pixel to be calibrated and the source pixel, the calibration weight can be calculated through a preset formula. Second, calculate the calibration amount based on the calibration weight and the vector volume. The detailed calculation method to calculate the calibration weight and the calibration amount are described above and will not be repeated here.

Method 1100 then proceeds to operation 1108, in which the pixel to be calibrated is calibrated based on the calibration amount and the calibration vector. As discussed above, a plurality of calibration vectors may be combined to complete a specific calibration, and the plurality of calibration vectors may be placed in a sequential order or a parallel order when combined. The above operations may be performed by processor 114 or control logic 104. By employing one or more calibration vectors, precise and complex calibration can be performed to specific color within a specific scope with a small data storage. Calibration vectors can achieve the same effects as 3D LUT with ignorable data storage.

The above detailed description of the disclosure and the examples described therein have been presented for the purposes of illustration and description only and not by limitation. It is therefore contemplated that the present disclosure covers any and all modifications, variations or equivalents that fall within the spirit and scope of the basic underlying principles disclosed above and claimed herein.

What is claimed is:

1. A system for display, comprising:

a display panel comprising a pixel array; and a processor configured to, upon executing instructions:

define a calibration vector with a source pixel, a vector volume, and a calibration range, wherein the calibration vector is configured to calibrate more than one pixel of the pixel array, wherein the source pixel is a parameter of grayscale values;

locate at least one center point from the pixel array for calibration based on the source pixel, wherein each center point of the at least one center point has a same grayscale value with the source pixel;

calculate a distance between each pixel and each center point;

calculate a calibration amount of a pixel to be calibrated based on the distance and the vector volume; and calibrate the pixel to be calibrated based on the calibration amount and the calibration vector.

2. The system according to claim 1, wherein the source pixel is a three-dimensional parameter ($R_{scr}$, $G_{scr}$, $B_{scr}$), where $R_{scr}$ is a grayscale value of a red channel of the source pixel;

$G_{scr}$ is a grayscale value of a green channel of the source pixel; and $B_{scr}$ is a grayscale value of a blue channel of the source pixel.

3. The system according to claim 1, wherein the vector volume is a three-dimensional parameter ($V_R$, $V_G$, $V_B$) configured to determine a maximal volume for calibration, where $V_R$ is a calibration value of a red channel of the source pixel;

$V_G$ is a calibration value of a green channel of the source pixel; and $V_B$ is a calibration value of a bule channel of the source pixel.

4. The system according to claim 1, wherein the calibration range is a four-dimensional parameter ($V_{Range}$, $S_R$, $S_G$, $S_B$) configured to determine a calibration scope, pixels within the calibration scope are calibrated by the calibration vector, where $V_{Range}$ is a preset distance between the pixel to be calibrated and the center point, the pixel to be calibrated is calibrated by the calibration vector when the distance between the pixel to be calibrated and the center point is smaller than $V_{Range}$;

$S_R$ is a calculation factor of a red channel when calculating the distance between the pixel to be calibrated and the center point;

$S_G$ is a calculation factor of a green channel when calculating the distance between the pixel to be calibrated and the center point; and $S_B$ is a calculation factor of a blue channel when calculating the distance between the pixel to be calibrated and the center point.

5. The system according to claim 1, wherein the distance between a pixel to be calibrated, and the center point is negatively correlated with the calibration amount applied to the pixel to be calibrated.

6. The system according to claim 1, wherein the processor is further configured to:

calculate a calibration weight based on the distance between a pixel to be calibrated and the center point; and calculate the calibration amount based on the calibration weight and the vector volume, the calibration amount is a three-dimensional parameter ($\Delta V_R$, $\Delta V_G$, $\Delta V_B$), where $\Delta V_R$ is a calibration amount of a red channel of the source pixel;

$\Delta V_G$ is a calibration amount of a green channel of the source pixel; and $\Delta V_B$ is a calibration amount of a bule channel of the source pixel.

7. The system according to claim 1, wherein the processor is further configured to calibrate the pixel to be calibrated based on a plurality of the calibration vectors and a plurality of calibration amounts corresponding to the plurality of the calibration vectors.

8. The system according to claim 7, wherein the plurality of calibration vectors are placed in a sequential order.

9. The system according to claim 7, wherein the plurality of calibration vectors are placed in a parallel order.

10. The system according to claim 1, wherein the calibration vector comprises at least one of a marginal vector for calibrating pixels of the pixel array, a white balance vector for compensating the pixels of the pixel array, or a local vector for calibrating at least one of the pixels of the pixel array.

11. The system according to claim 1, further comprising a register configured to store the calibration vector, wherein the calibration vector stored in the register is retrieved by the processor repeatedly.

12. A method for calibrating a display having a pixel array, comprising:

defining a calibration vector with a source pixel, a vector volume, and a calibration range, wherein the source pixel is a parameter of grayscale values;

locating at least one center point from the pixel array for calibration based on the source pixel, wherein each center point of the at least one center point has a same grayscale value with the source pixel;

calculating a distance between a pixel to be calibrated and the source pixel;

calculating a calibration amount based on the distance and the vector volume; and calibrating the pixel to be calibrated based on the calibration amount and the calibration vector, wherein the distance between the pixel to be calibrated and the source pixel is negatively correlated with the calibration amount applied on the pixel to be calibrated.

13. The method according to claim 12, wherein the source pixel is a three-dimensional parameter ($R_{scr}$, $G_{scr}$, $B_{scr}$), where $R_{scr}$ is a grayscale value of a red channel of the source pixel;

$G_{scr}$ is a grayscale value of a green channel of the source pixel; and $B_{scr}$ is a grayscale value of a blue channel of the source pixel.

14. The method according to claim 12, wherein the vector volume is a three-dimensional parameter ($V_R$, $V_G$, $V_B$) configured to determine a maximal volume for calibration, where $V_R$ is a calibration value of a red channel of the source pixel;

$V_G$ is a calibration value of a green channel of the source pixel; and $V_B$ is a calibration value of a bule channel of the source pixel.

15. The method according to claim 12, wherein the calibration range is a four-dimensional parameter ($V_{Range}$, $S_R$, $S_G$, $S_B$) configured to determine a calibration scope, pixels within the calibration scope are calibrated by the calibration vector, where $V_{Range}$ is a preset distance between the pixel to be calibrated and the center point, the pixel to be calibrated is calibrated by the calibration vector when the distance between the pixel to be calibrated and the center point is smaller than $V_{Range}$;

$S_R$ is a calculation factor of a red channel when calculating the distance between the pixel to be calibrated and the center point;

$S_G$ is a calculation factor of a green channel when calculating the distance between the pixel to be calibrated and the center point; and $S_B$ is a calculation factor of a blue channel when calculating the distance between the pixel to be calibrated and the center point.

16. The method according to claim 12, wherein the calculating a calibration amount based on the distance and the vector volume comprises:

calculating a calibration weight based on the distance between a pixel to be calibrated and the center point; and calculating the calibration amount based on the calibration weight and the vector volume, the calibration amount is a three-dimensional parameter ($\Delta V_R$, $\Delta V_G$, $\Delta V_B$), where $\Delta V_R$ is a calibration amount of a red channel of the source pixel;

$\Delta V_G$ is a calibration amount of a green channel of the source pixel; and $\Delta V_B$ is a calibration amount of a bule channel of the source pixel.

17. The method according to claim 12, wherein the pixel to be calibrated is calibrated based on a plurality of the calibration vectors and a plurality of calibration amounts corresponding to the calibration vectors.

18. The method according to claim 12, wherein the calibration vector comprises at least one of a marginal vector for calibrating pixels of the pixel array, a white balance vector for compensating the pixels of the pixel array, or a local vector calibrating at least one of the pixels of the pixel array.

19. A processor for calibrating a display having a pixel array, comprising:

a vector defining module configured to define a calibration vector with a source pixel, a vector volume, and a calibration range, wherein the source pixel is a parameter of grayscale values;

a first calculator configured to calculate a distance between a pixel to be calibrated and a center point having a same grayscale value with the source pixel;

a second calculator configured to calculate a weight based on the distance between the pixel to be calibrated and the source pixel and calculate a calibration amount based on a calibration weight and the vector volume; and a calibrating module configured to calibrate the pixel to be calibrated based on the calibration amount and the calibration vector, wherein the calibration amount is a three-dimensional parameter ($\Delta V_R$, $\Delta V_G$, $\Delta V_B$), where $\Delta V_R$ is a calibration amount of a red channel of the source pixel, $\Delta V_G$ is a calibration amount of a green channel of the source pixel; and $\Delta V_B$ is a calibration amount of a bule channel of the source pixel.

* * * * *